United States Patent
Gao et al.

(10) Patent No.: US 10,727,967 B2
(45) Date of Patent: Jul. 28, 2020

(54) NETWORK NODE, WIRELESS DEVICE AND METHODS THEREIN FOR PERFORMING AND HANDLING SUPERPOSED TRANSMISSIONS IN A WIRELESS COMMUNICATIONS NETWORK

(71) Applicant: Telefonaktiebolaget LM Ericsson (publ), Stockholm (SE)

(72) Inventors: Shiwei Gao, Nepean (CA); Mattias Frenne, Uppsala (SE); Robert Mark Harrison, Grapevine, TX (US); Bo Lincoln, Lund (SE); Siva Muruganathan, Stittsville (CA); Zhang Zhang, Beijing (CN)

(73) Assignee: Telefonaktiebolaget LM Ericsson (Publ) (SE)

( * ) Notice: Subject to any disclaimer, the term of this patent is extended or adjusted under 35 U.S.C. 154(b) by 127 days.

(21) Appl. No.: 15/750,416

(22) PCT Filed: Aug. 18, 2016

(86) PCT No.: PCT/SE2016/050769
§ 371 (c)(1),
(2) Date: Feb. 5, 2018

(87) PCT Pub. No.: WO2017/030496
PCT Pub. Date: Feb. 23, 2017

(65) Prior Publication Data
US 2018/0262288 A1    Sep. 13, 2018

Related U.S. Application Data

(60) Provisional application No. 62/207,510, filed on Aug. 20, 2015.

(51) Int. Cl.
*H04J 11/00*    (2006.01)
*H04J 7/00*    (2006.01)
(Continued)

(52) U.S. Cl.
CPC ............... *H04J 11/004* (2013.01); *H04J 7/00* (2013.01); *H04J 13/0003* (2013.01);
(Continued)

(58) Field of Classification Search
None
See application file for complete search history.

(56) References Cited

U.S. PATENT DOCUMENTS

| 2014/0086160 | A1* | 3/2014 | Kim | ........................ H04W 52/00 |
| | | | | 370/329 |
| 2015/0171947 | A1 | 6/2015 | Sun et al. | |

(Continued)

FOREIGN PATENT DOCUMENTS

| CN | 1010897133 A | 11/2010 |
| CN | 102652402 A | 8/2012 |

(Continued)

OTHER PUBLICATIONS

International Search Report and Written Opinion dated Nov. 11, 2016 for International Application No. PCT/SE2016/050769 consisting of 15-Pages.

(Continued)

*Primary Examiner* — Rebecca E Song
(74) *Attorney, Agent, or Firm* — Christopher & Weisberg, P.A.

(57) ABSTRACT

Performing a superposed transmission in a wireless communications network. The superposed transmission includes a first signal intended for a first wireless device and a second signal intended for a second wireless device that are superposed and transmitted simultaneously by the network node on the same transmission resources. A first ratio and a second ratio of the total transmission power available for the superposed transmission are determined. The first ratio is to be used for the first signal and the second ratio is to be used (Continued)

for the second signal. Information indicating the first and/or second ratio is transmitted to at least the first wireless device and the superposed transmission to the first and second wireless device is performed simultaneously on the same transmission resources by transmitting the first signal using a transmission power according to the first ratio and the second signal using a transmission power according to the second ratio.

24 Claims, 27 Drawing Sheets

(51) Int. Cl.
    *H04L 5/00*        (2006.01)
    *H04L 27/26*      (2006.01)
    *H04W 52/34*     (2009.01)
    *H04J 13/00*      (2011.01)
    *H04W 72/04*     (2009.01)

(52) U.S. Cl.
    CPC .......... *H04L 5/0014* (2013.01); *H04L 5/0037* (2013.01); *H04L 5/0044* (2013.01); *H04L 5/0069* (2013.01); *H04L 27/2604* (2013.01); *H04W 52/346* (2013.01); *H04L 27/2601* (2013.01); *H04W 72/042* (2013.01)

(56) References Cited

U.S. PATENT DOCUMENTS

| | | | | |
|---|---|---|---|---|
| 2015/0351081 | A1* | 12/2015 | Zhu ........................ | H04J 11/003 370/329 |
| 2015/0358064 | A1 | 12/2015 | Benjebbour et al. | |
| 2016/0095090 | A1* | 3/2016 | Xue ........................ | H04J 11/005 370/329 |
| 2016/0366691 | A1* | 12/2016 | Kwon ................... | H04L 1/0001 |
| 2018/0375626 | A1* | 12/2018 | Kim ........................ | H04L 27/34 |
| 2019/0014546 | A1* | 1/2019 | Wu ........................ | H04W 52/16 |

FOREIGN PATENT DOCUMENTS

| | | |
|---|---|---|
| CN | 103477584 A | 12/2013 |
| WO | 2011069778 A1 | 6/2011 |
| WO | 2014104114 A1 | 7/2014 |

OTHER PUBLICATIONS

3GPP TSG RAN WG1 Meeting #82 R1-153985, Title:"Discussion on downlink multiuser superposition schemes and signaling assistance", Source: Intel Corporation, Agenda Item: 7.2.7.1, Document for: Discussion and Decision, Location and Date: Beijing, China, Aug. 24-28, 2015, consisting of 3-pages.
3GPP TSG RAN WG1 Meeting #82 R1-153986, Title:"System-level modeling of the downlink multi-user superposition transmission schemes", Source: Intel Corporation, Agenda Item: 7.2.7.2, Document for: Discussion and Decision, Location and Date: Beijing, China, Aug. 24-28, 2015, consisting of 6-pages.
3GPP TSG RAN WG4 Meeting #70 R4-140609, Title:"Discussion on PDSCH interference signal parameters detection for NAICS", Source: Intel Corporation, Agenda Item: 9.4.3, Document for: Discussion, Location and Date: Prague, Czech Republic, Feb. 10-14, 2014, consisting of 14-pages.
3GPP TR 36.859 V0.2.0, Title:"3rd Generation Partnership Project; Technical Specification Group Radio Access Network; Study on Downlink Multiuser Superposition Transmission; (MUST) for LTE; (Release 13)", May 2015, consisting of 13-pages.
3GPP TS 36.211 V12.1.0, Title:"3rd Generation Partnership Project; Technical Specification Group Radio Access Network; Evolved Universal Terrestrial Radio Access (E-UTRA); Physical channels and modulation; (Release 12)", Mar. 2014, consisting of 120-pages.
3GPP TS 36.213 V12.1.0, Title:"3rd Generation Partnership Project; Technical Specification Group Radio Access Network; Evolved Universal Terrestrial Radio Access (E-UTRA); Physical layer procedures; (Release 12)", Mar. 2014, consisting of 186-pages.
European Search Report dated Jan. 10, 2019 for Application No. 16 757 985.3, consisting of 6-pages.
Chinese Office Action and Search Report and English Translation dated Jun. 5, 2020, for Application No. 201680061361.4, consisting of 24-Pages.
3GPP TSG RAN WG4 Meeting #70 R4-140609, Title:"Discussion on PDSCH interference signal parameters detection or NAICS", Source: Intel Corporation, Agenda Item: 9.4.3, Document for: Discussion, Location and Date: Prague, Czech Republic, Feb. 10-14, 2014, consisting of 21-pages.

* cited by examiner

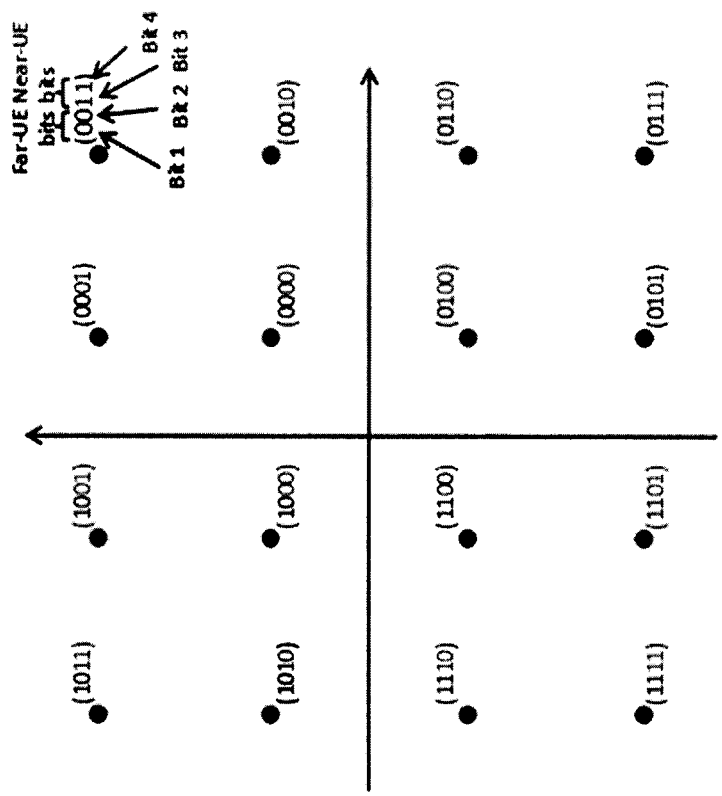

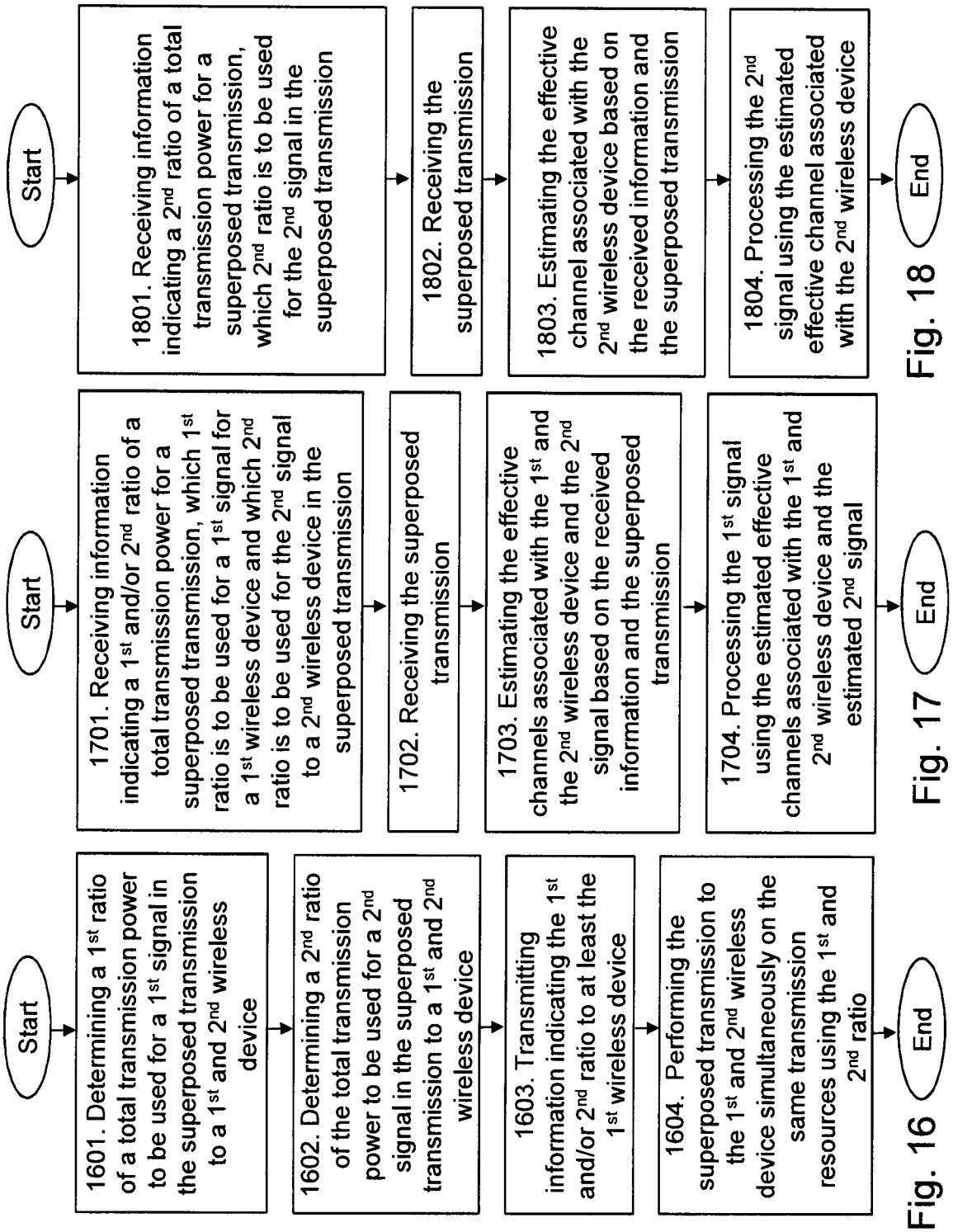

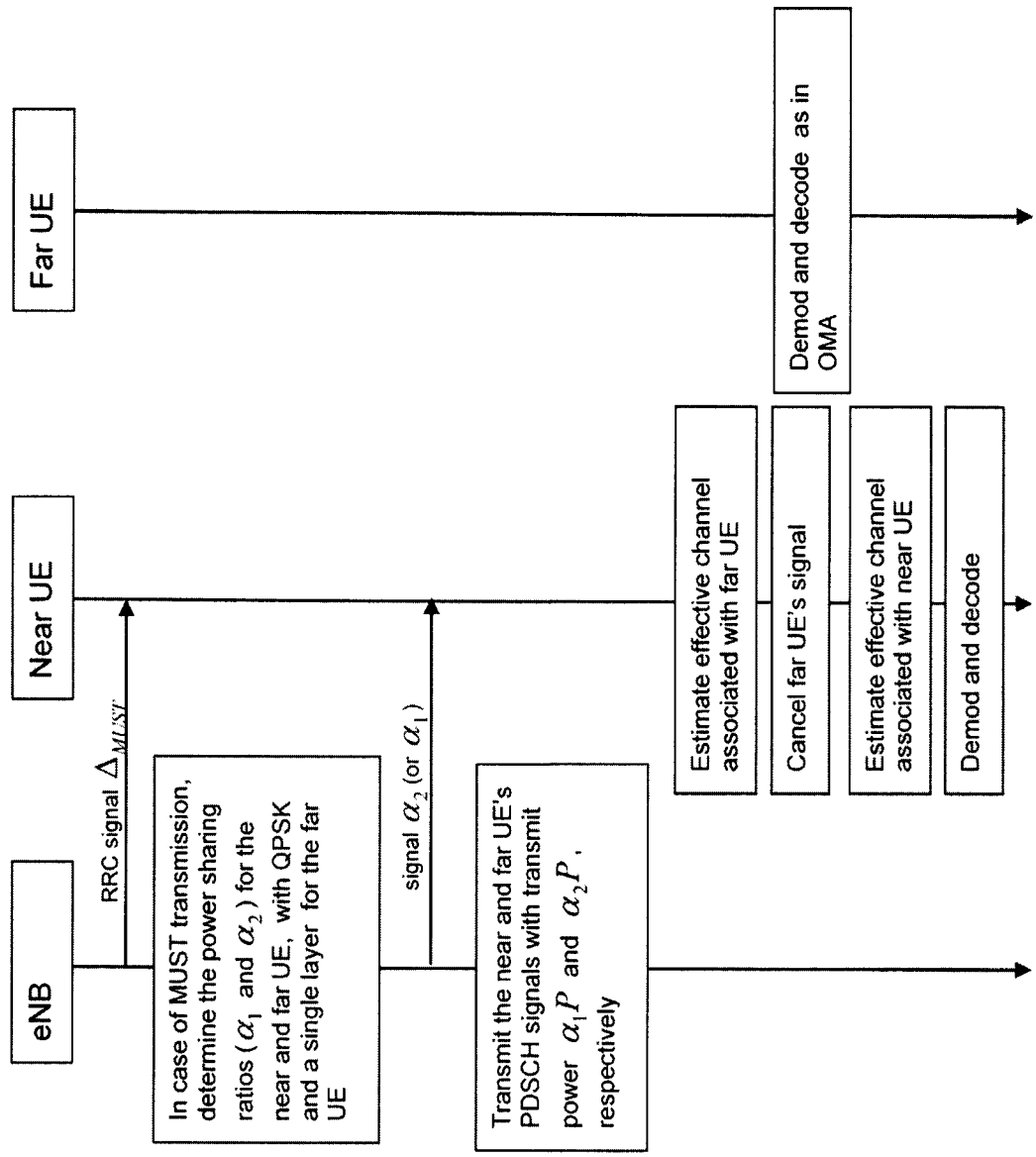

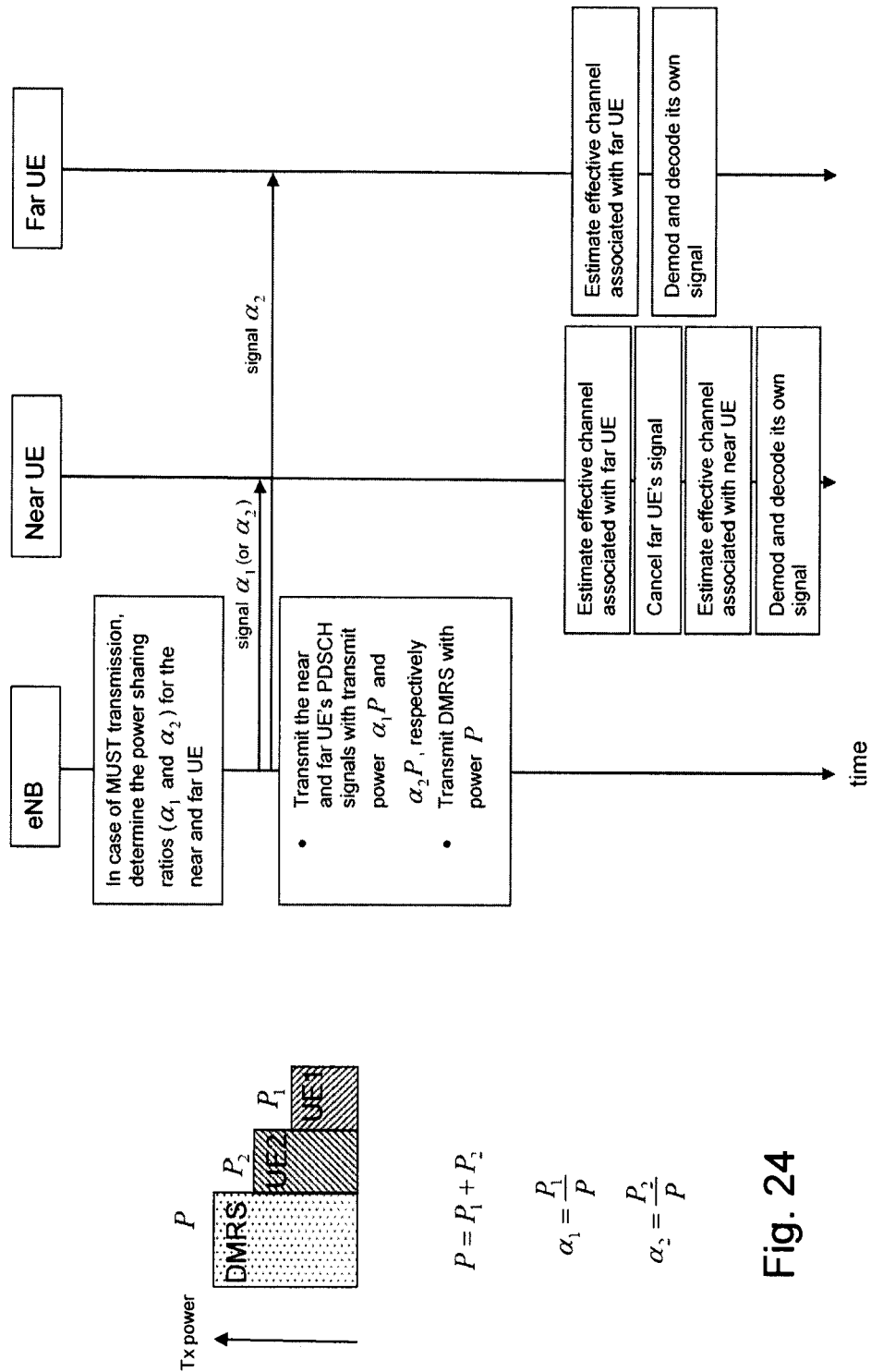

NETWORK NODE, WIRELESS DEVICE AND METHODS THEREIN FOR PERFORMING AND HANDLING SUPERPOSED TRANSMISSIONS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2016/050769, filed Aug. 18, 2016 entitled "A NETWORK NODE, A WIRELESS DEVICE AND METHODS THEREIN FOR PERFORMING AND HANDLING SUPERPOSED TRANSMISSIONS IN A WIRELESS COMMUNICATIONS NETWORK," which claims priority to U.S. Provisional Application No. 62/207,510, filed Aug. 20, 2015, entitled "NETWORK NODE, WIRELESS DEVICE AND METHODS THEREIN FOR PERFORMING AND HANDLING SUPERPOSED TRANSMISSIONS IN A WIRELESS COMMUNICATIONS NETWORK," the entirety of both of which are incorporated herein by reference.

TECHNICAL FIELD

Embodiments herein relate to a network node, a wireless device and methods therein. In particular, embodiments herein relate to performing and handling superposed transmissions in a wireless communications network.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station. The wireless devices transmit data over an air or radio interface to the radio base stations in uplink (UL) transmissions and the radio base stations transmit data over an air or radio interface to the wireless devices in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a DL transmission from a radio base station to a wireless device. Single Carrier-Frequency Domain Multiple Access (SC-FDMA) is used in an UL transmission from the wireless device to the radio base station. Services in LTE are supported in the packet switched domain. The SC-FDMA used in the UL is also referred to as Discrete Fourier Transform Spread (DFTS)-OFDM.

The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

Downlink and uplink transmissions are dynamically scheduled, i.e. in each subframe the radio base station transmits control information about to or from which wireless devices data is transmitted and upon which resource blocks the data is transmitted. The control information for a given wireless device is transmitted using one or multiple Physical Downlink Control Channels (PDCCH). Control information of a PDCCH is transmitted in the control region comprising the first n=1, 2, 3 or 4 OFDM symbols in each subframe where n is the Control Format Indicator (CFI). Typically the control region may comprise many PDCCH carrying control information to multiple wireless devices simultaneously. A downlink system with 3 OFDM symbols allocated for control signaling, for example the PDCCH, is illustrated in FIG. 3 and denoted as control region. The resource elements used for control signaling are indicated with wave-formed lines and resource elements used for reference symbols are indicated with diagonal lines. Frequencies f or subcarriers are defined along a z-axis and symbols are defined along an x-axis.

Physical Downlink Channels and Transmission Modes

In LTE, a number of physical DL channels are supported. A downlink physical channel corresponds to a set of resource elements carrying information originating from higher layers. The following physical DL channels are supported in LTE:

Physical Downlink Shared Channel, PDSCH
Physical Broadcast Channel, PBCH
Physical Multicast Channel, PMCH
Physical Control Format Indicator Channel, PCFICH
Physical Downlink Control Channel, PDCCH
Physical Hybrid ARQ Indicator Channel, PHICH
Enhanced Physical Downlink Control Channel, EPDCCH.

PDSCH is used mainly for carrying user traffic data and higher layer messages. PDSCH is transmitted in a DL sub-frame outside of the control region as shown in FIG. 3. Both PDCCH and EPDCCH are used to carry Downlink Control Information (DCI), such as, PRB allocation, modulation level and coding scheme (MCS), pre-coder used at the transmitter, etc. PDCCH is transmitted in the first one to four OFDM symbols in a DL sub-frame, i.e. the control region, while EPDCCH is transmitted in the same region as PDSCH.

Different DCI formats are defined in LTE for DL and UL data scheduling. For example, DCI formats 0 and 4 are used for UL data scheduling, while DCI formats 1, 1A, 1B, 1C, 1D, 2, 2A, 2B, 2C, 2D are used for DL data scheduling. In DL, which DCI format is used for data scheduling is associated with a DL transmission scheme and/or the type of message to be transmitted. The following transmission schemes are defined in LTE:

Single-antenna port
Transmit diversity (TxD)
Open-loop spatial multiplexing
Close-loop spatial multiplexing
Multi-user MIMO (MU-MIMO)
Dual layer transmission
Up to 8 layer transmission PDCCH is always transmitted with either the single-antenna port or Transmit Diversity scheme, while PDSCH can use any one of the transmission schemes. In LTE, a wireless device is configured with a transmission mode (TM), rather than a transmission scheme. There are 10 TMs, i.e. TM1 to TM10, defined so far for PDSCH in LTE. Each TM defines a primary transmission scheme and a backup transmission scheme. The backup transmission scheme is either single antenna port or TxD. The primary transmission scheme for the 10 TMs are:

TM1: single antenna port, port 0
TM2: TxD
TM3: open-loop SM
TM4: close-loop SM
TM5: MU-MIMO
TM6: Close-loop SM with a single transmission layer
TM7: single antenna: port 5
TM8: dual layer transmission or single antenna port: port 7 or 8
TM9: up to 8 layer transmission, port 7-14 or single antenna port: port 7 or 8
TM10: up to 8 layer transmission, port 7-14 or single antenna port: port 7 or 8

In TM1 to TM6, cell specific reference signal (CRS) is used as the reference signal for channel estimation at the wireless device for demodulation. While in TM7 to TM10, UE specific demodulation reference signal (DMRS) is used as the reference signal for channel estimation and demodulation. Antenna ports 0 to 3 are CRS ports, while ports 7 to 14 are DMRS ports. TM4 is a CRS based single user (SU) multiple input and multiple output (MIMO) scheme, in which multiple data layers for the same wireless device are multiplexed and transmitted on the same PDB. On the other hand, TM9 or TM10 is a DMRS based SU-MIMO scheme. In TM4 pre-coder needs to be signalled to a UE dynamically. Such information is, however, not required in TM9 and TM10.

Spatial Division Multiplexing (SDMA) or MU-MIMO

When two wireless devices are located in different areas of a cell such that they may be separated through different precoding (or beamforming) at the radio base station, i.e. network node, the two wireless devices may be served with the same time-frequency resources (i.e. PRBs) in a sub-frame by using different beams. A beam is defined by a pre-coder. This approach is called multi-user MIMO, MU-MIMO. In CRS based transmission mode, TM5 may be used for MU-MIMO transmission, in which a wireless device is informed about the MU-MIMO operation. The pre-coder used and the transmit power offset are dynamically signalled to the wireless device through DCI format 1D. In DMRS based transmission modes TM9 and TM10, different DMRS ports and/or the same DMRS port with different scrambling codes can be assigned to the wireless devices for MU-MIMO transmission. In this case, MU-MIMO is transparent to wireless device, i.e., a wireless device is not informed about MU-MIMO, i.e. that another wireless device is scheduled in the same PRB.

In LTE downlink, a number of reference signals (RS) are provided for channel estimation and demodulation purpose. There is one reference signal transmitted per antenna port. An antenna port is defined such that the channel over which a symbol on the antenna port is conveyed may be inferred from the channel over which another symbol on the same antenna port is conveyed.

Cell Specific Reference Signals

One DL RS type is Cell specific Reference Signals, CRSs. CRSs are transmitted in every sub-frame and over the entire frequency band. Up to four CRS ports are supported. CRSs are transmitted on a grid of Resource Elements, REs, in each PRB and may be used for downlink channel estimation purpose. An example of the CRS RE locations in a PRB is shown in FIG. 4. The frequency locations of the CRS REs are cell dependent and may be shifted for cells with different physical cell IDs. For channel estimation, the channels on the CRS REs are first estimated. The channels on the data REs are then estimated by interpolation or filtering the channels estimated on the CRS REs.

Since CRSs are cell specific, i.e. they are transmitted to all wireless devices in a cell, but for different wireless devices the downlink transmit power and precoding for PDSCH may be different. Therefore, for correct demodulation and channel quality reporting, the power offset, i.e. relative to the CRS transmit power, and the pre-coder used for PDSCH transmission to a wireless device need to be signalled to the wireless device. Currently, the power offset is semi-statically signalled, i.e. by RRC signalling, to a wireless device using a parameter referred to as $P_A$. The ratio of PDSCH energy per RE, EPRE, to CRS EPRE among PDSCH REs in an OFDM symbol not containing CRS is denoted by $\rho_A$. For a UE in transmission modes 1-7, the UE may assume that for 16 QAM, 64 QAM, spatial multiplexing with more than one layer or for PDSCH transmissions associated with the MU MIMO transmission scheme, $\rho_A = \delta_{power\text{-}offset} + P_A$ [dB], where $\delta_{power\text{-}offset}$ is 0 dB for all PDSCH transmission schemes except multi-user MIMO, in which $\delta_{power\text{-}offset}$ is dynamically indicated. One exception is PDSCH data transmission using precoding for transmit diversity with 4 cell-specific antenna ports, in which case $\rho_A = \delta_{power\text{-}offset} + P_A + 10 \log_{10}(2)$ [dB].

The range of $P_A$ is from −6 dB to +3 dB. Pre-coder is dynamically signalled, i.e. by DCI information in the scheduling message, to a wireless device. In TM5, it is possible to dynamically signal an additional power offset $\delta_{power\text{-}offset}$ of −3 dB between CRS EPRE and PDSCH EPRE, this is used in case the wireless device is MU-MIMO scheduled with another wireless device in case the PDSCH power per wireless device is reduced by 3 dB.

DL Demodulation Reference Signal (DMRS)

DMRS is also used for downlink channel estimation and demodulation for TM8, TM9 and TM10. Unlike CRS, DMRS is wireless device specific, i.e. it is only transmitted when there is DL data transmission to a wireless device and in those PRBs where the PDSCH is transmitted. There are eight DMRS ports (ports 7 to 15) defined in LTE and thus up to eight layers of PDSCH data may be supported. For wireless devices with a single layer transmission, either port 7 or port 8 can be used. The DMRS port used is dynamically indicated in the associated PDCCH or EPDCCH. The DMRS ports are transmitted on certain fixed REs in a PRB. The RE pattern for port 7 and port 8 are shown in FIG. 4. Ports 7 and 8 occupy the same set of REs in a PRB and the two ports are multiplexed by using orthogonal codes. DMRS is pre-coded with the same pre-coder as the data, so when the wireless device has estimated the channel from DMRS it can directly use the channel estimate for PDSCH demodulation. For DMRS ports 7 and 8, they are also transmitted with the same per RE power as the associated PDSCH data, hence the offset is always 0 dB. Therefore, pre-coder and transmit power offset are not needed at a wireless device for channel estimation and demodulation purpose.

Downlink Power Allocation in LTE

In LTE downlink, the network node determines the downlink transmit power for each wireless device. A wireless device is signalled semi-statically, by RRC signalling the parameter $P_A$, which may have a value of [−6, −4.77, −3 dB, −1.77, 0, 1, 2, 3] dB.

$P_A$ represents the baseline transmit power ratio between the PDSCH and the CRS. The wireless device may derive actual transmit power ratio between the PDSCH and the CRS from $P_A$ for a given transmission mode, the number of transmit antennas at the network node, the modulation level and the number of layers in a PDSCH transmission.

CRS Based Transmission Modes

In case of CRS based transmission modes (TM1 to TM6), the channel estimation is done through CRS. The transmit power ratio may be derived from a semi-statically signalled parameter $P_A$, and an antenna pre-coder W is either pre-defined (e.g. TM2 and TM3) or signalled to the wireless device dynamically in each sub-frame (e.g. TM4, TM5, TM6).

DMRS Based Transmission Modes

In case of DMRS based transmission modes (TM7, TM8, TM9, TM10) in LTE, channel estimation is based on UE specific DMRS, which is pre-coded using the same pre-coder and the same transmit power as PDSCH data so the ratio is fixed to 0 dB.

Multi-User Superposition Transmission (MUST)

In LTE up to release 12, only orthogonal multiple access, OMA, is used where wireless devices are multiplexed either time, frequency or spatial domain or a combination of the time, frequency and spatial domains. Another possible form of wireless device data multiplexing currently under study in LTE release 13 is called Multi-User Superposition Transmission, MUST. This is described, for example, in the documents: 3GPP TR 36.859, "Study on Downlink Multiuser Superposition Transmission for LTE"; 3GPP R1-152493, Huawei HiSilicon, "Candidate schemes for superposition transmission," May 2015; 3GPP R1-153333, NTT DOCOMO, "Candidate non-orthogonal multiplexing access scheme," May 2015; 3GPP R1-151425, Qualcomm Incorporated, "Multiuser superposition schemes," April 2015; and 3GPP R1-153332, NTT DOCOMO, "Evaluation methodologies for downlink multiuser superposition transmissions," May 2015.

In MUST, two (or more) wireless device with different path losses, or SINR, to a network node, e.g. a serving radio base station or eNB transmitter, are superposed on the same time-frequency and/or spatial resources. This may be realized by assigning different transmit powers to different wireless devices. The transmit power level allocated to a given wireless device is generally determined by the channel condition (i.e., path loss) experienced by the wireless devices. For instance, wireless devices having higher path loss, e.g. wireless devices located far away from the network node, may be allocated higher transmit powers, while wireless devices having lower path loss, e,g, wireless devices located close to the network node, may be allocated lower transmit powers. The total combined transmit power may, however, be kept the same.

One example is shown FIG. 5. In FIG. 5, a first wireless device, UE1, located a first distance from the network node and a second wireless device, UE2, located a second distance from the network node are present in a cell of a wireless communications network. Since the first wireless device, UE1, is located closer to the network node than the second wireless device, UE2, i.e. the first distance is shorter than the second distance, the first wireless device, UE1, may also be referred to as a near wireless device or near, while the second wireless device, UE2, may also be referred to as a far wireless device or far UE. However, it should be noted that this illustration is just one example. Generally, a "near UE" is not necessarily physically closer to the network node than the "far UE". For example, a "far UE" may be inside a building and has poorer received signal than a "near UE" which has a line of sight path to the network node. In this case, the "far UE" may be physically closer to the network node than the "near UE". So, the terms "near UE" and "far UE" are herein used to indicate the relative signal quality received at a UE, that is, a "near UE" has a better received signal quality than a "far UE".

The two wireless devices, UE1 and UE2, may, for example, be superposed at the same time-frequency resource according to Eq. 1:

$$x = \sqrt{P_1} s_1 + \sqrt{P_2} s_2 \quad \text{(Eq. 1)}$$

where x is the superposed signal transmitted from the network node, and $P_i$ is the allocated transmit power to the wireless devices, UE i (i=1,2). Also, $$\sum_i P_i = P,$$

where P is the total transmit power over the resource element.

The received signal y at the wireless devices, UE i (i=1,2) may then be described according to Eq. 2:

$$y_i = H_i (\sqrt{P_1} s_1 + \sqrt{P_2} s_2) + v_i \quad \text{(Eq. 2),}$$

or according to Eq. 3:

$$y_i = H_i \sqrt{P} (\sqrt{\alpha_1} s_1 + \sqrt{\alpha_2} s_2) + v_i \quad \text{(Eq. 3)}$$

where $H_i$ (i=1,2) is the channel response to UE i, and $$\alpha_1 = \frac{P_1}{P} \text{ and } \alpha_2 = \frac{P_2}{P}, v_i(i=1,2)$$

is the receiver noise at the wireless devices, UE i (i=1,2).

FIG. 6 shows the received signal power at each of the wireless devices, UE i (i=1,2). Since the first wireless device, UE1, is closer to the network node i.e. a cell centre wireless device, than the second wireless device, UE2, being far away from the network node i.e. a cell edge wireless device, the first wireless device, UE1, will have a smaller propagation path loss compared to the second wireless device, UE2, which will have a larger propagation path loss. To reach the second wireless device, UE2, a higher transmit power is needed than for the first wireless device, UE1, i.e. $P_2 > P_1$. By $P_1$ being much smaller than $P_2$, the second wireless device, UE2, may still be able to decode its data successfully at the presence of signal of the first wireless device, UE1.

Since the first wireless device, UE1, is close to the network node the first wireless device, UE1, will experience a strong signal intended to the second wireless device, UE2. If the first wireless device, UE1, may estimate the signal $H_1 \cdot \sqrt{P_2}s_2$, then the first wireless device, UE1, may cancel this estimate from the received signal $y_1$. After the cancellation, the first wireless device, UE1, would be able to decode its own signal.

A general MUST transmitter and receiver are shown in FIGS. 7-8, respectively. When the network node has multiple transmit antennas, each of the signals may be pre-coded before transmission. In this case, the transmitted signal from the network node becomes x according to Eq. 4:

$$x = \sqrt{P_1}W_1 s_1 + \sqrt{P_2}W_2 s_2 \quad \text{(Eq. 4)}$$

where $\underline{x} = [x_1, x_2, \ldots, x_{N_{TX}}]^T$ and $x_n (n=1, \ldots, N_{TX})$ is the transmitted signal on the $n^{th}$ antenna, $N_{TX}$ is the number of transmit antennas, $\underline{W}_i$ (i=1,2) is a $N_{TX} \times 1$ precoding vector applied to the signal $s_i$.

If the first and second wireless device, UE1 and UE2, also have multiple receive antennas, the received signal at UE i (i=1,2) becomes y according to Eq. 5:

$$\underline{y}_i = \underline{H}_i \underline{x} + \underline{v}_i = \underline{H}_i (\sqrt{P_1}W_1 s_1 + \sqrt{P_2}W_2 s_2) + \underline{v}_i \quad \text{(Eq. 5)}$$

where $\underline{y}_i = [y_i(1), y_i(2), \ldots, y_i(N_i^{RX})]^T$, $y_i(k)$ is the received signal on antenna k of UE i, $N_i^{RX}$ is the number of receive antennas of UE i;

$\underline{H}_i$ is a $N_i^{RX} \times N_{TX}$ channel matrix, and $\underline{v}_i$ is a $N_i^{RX} \times 1$ noise vector.

Similar to the single antenna case, if the first wireless device, UE1, may, by using the channel estimate $\hat{\underline{H}}_1$ and information about $\sqrt{P_2}\underline{W}_2$, estimate the transmitted signal $\sqrt{P_2}\underline{W}_2 s_2$, then the first wireless device, UE1, is able to decode its own signal after subtracting $\hat{\underline{H}}_1 \cdot \sqrt{P_2}\underline{W}_2 s_2$ from the received signal $\underline{y}_1 = \underline{H}_1 \cdot (\sqrt{P_1}\underline{W}_1 s_1 + \sqrt{P_2}\underline{W}_2 s_2) + \underline{v}_1$. $\hat{\underline{H}} \cdot \sqrt{P_1}\underline{W}_1$ may be referred to herein as the estimated effective channel associated with UE1 observed at UE1, and $\hat{\underline{H}} \cdot \sqrt{P_2}\underline{W}_2$ may be referred to herein as the estimated effective channel associated with UE2 observed at UE1. Similarly, $\hat{\underline{H}}_2 \cdot \sqrt{P_2}\underline{W}_2$ may be referred to herein as the estimated effective channel associated with UE2 observed at UE2, where $\hat{\underline{H}}_2$ is the estimated channel at UE2.

MUST Transmission Schemes

Three variants of MUST schemes are being considered in the LTE Release 13 study item on MUST, see for example, 3GPP TR 36.859, "Study on Downlink Multiuser Superposition Transmission for LTE". Brief descriptions of these schemes are given below.

Non-Orthogonal Multiple Access (NOMA)

In the NOMA scheme, the information bits corresponding to the far UE, i.e. the second wireless device, UE2, and the near UE, i.e. the first wireless device, UE1, are independently encoded and modulated. The symbol $s_1$ is drawn from a near UE constellation and the symbol $s_2$ is drawn from a far UE constellation. Then, the superposed symbol x in the NOMA scheme has a superposed constellation (e.g. a superconstellation).

One example of the superposed NOMA constellation for the case where both the near UE, i.e. the first wireless device, UE1, and far UE, i.e. the second wireless device, UE2, employ QPSK constellation is shown in FIG. 9. In this case, the superposed constellation is similar to a 16QAM constellation.

Semi-Orthogonal Multiple Access (SOMA)

The SOMA scheme differs from the NOMA scheme in that the SOMA scheme uses Gray mapped superposed constellation. The coded modulation symbols of near UE and far UE, i.e. of the first and second wireless device, UE1 and UE2, are jointly Gray mapped and then added together, such as, e.g. in Eq. 1 shown above.

One example of the superposed SOMA constellation for the case where both the near UE, i.e. the first wireless device, UE1, and far UE, i.e. the second wireless device, UE2, employ QPSK constellation is shown in FIG. 10. In this case, $\alpha = \alpha_1$.

Rate-Adaptive Constellation Expansion Multiple Access (REMA)

The REMA scheme is similar to the SOMA scheme, however, with one restriction that the resulting superposed constellation should be a regular QAM constellation having equal horizontal and vertical spacing between constellation points (as is used in e.g. LTE).

In the REMA scheme, the bits with the higher bit-level capacities are allocated for the far UE, i.e. the second wireless device, UE2, and the bits with the lower bit-level capacities are allocated for the near UE, i.e. the first wireless device, UE1. In addition, a power sharing parameter may also be set appropriately so that the resulting superposed constellation is a regular QAM constellation.

There are six different ways (as shown in Table 1 below) of realizing the REMA scheme that has LTE standard constellations as superposed constellations. FIG. 11 shows one example of a 16-QAM superposed REMA constellation.

TABLE 1

| Superposed Constellation | Far UE Constellation | Near UE Constellation | Near UE Power Share $\alpha_1$ in dB | Far UE Power Share $\alpha_2$ in dB |
|---|---|---|---|---|
| 16-QAM | QPSK | QPSK | −6.9867 dB | −0.9691 dB |
| 64-QAM | QPSK | 16-QAM | −6.2342 dB | −1.1805 dB |
| 64-QAM | 16-QAM | QPSK | −13.1876 dB | −0.2136 dB |
| 256-QAM | QPSK | 64-QAM | −6.0730 dB | −1.2321 dB |
| 256-QAM | 16-QAM | 16-QAM | −12.2915 dB | −0.2641 dB |
| 256-QAM | 64-QAM | QPSK | −19.2082 dB | −0.0524 dB |

Network Node Scheduling

In each sub-frame and each scheduling sub-band, the network node may schedule wireless devices using either OMA transmission or MUST transmission depending on whether or not a suitable wireless device pair can be found for a MUST scheduling based on some scheduling metric, such as, e.g. Proportional Fairness, PF.

If there is a suitable pair of wireless devices found in a sub-frame, then MUST transmission may be scheduled. Otherwise, an OMA transmission may be scheduled.

One example is shown in FIG. 12, wherein a suitable wireless device pair, UE1 and UE2, are found and a MUST transmission is scheduled for these two wireless devices in the sub-frame (k+2). In the remaining sub-frames, OMA transmission is scheduled.

SUMMARY

It is an object of embodiments herein to improve superposition transmissions in a wireless communications network.

According to a first aspect of embodiments herein, the object is achieved by providing a method performed by a network node for performing a superposed transmission in a wireless communications network. The superposed transmission comprises a first signal intended for a first wireless device from the network node and a second signal intended for a second wireless device from the network node that are superposed and transmitted simultaneously by the network node on the same transmission resources in the wireless communications network. The network node determines a first ratio of the total transmission power available for the superposed transmission, which first ratio is to be used for the first signal in the superposed transmission. Also, the network node determines a second ratio of the total transmission power available for the superposed transmission, which second ratio is to be used for the second signal in the superposed transmission. Then, the network node transmits information indicating the first and/or second ratio to at least the first wireless device in the wireless communications network. Further, the network node performs the superposed transmission to the first and second wireless device simultaneously on the same transmission resources by transmitting the first signal using a transmission power according to the first ratio and by transmitting the second signal using a transmission power according to the second ratio.

According to a second aspect of embodiments herein, the object is achieved by providing a network node for performing a superposed transmission in a wireless communications network. The superposed transmission comprises a first signal intended for a first wireless device from the network node and a second signal intended for a second wireless device from the network node that are superposed and transmitted simultaneously by the network node on the same transmission resources in the wireless communications network. The network node is configured to determine a first ratio of the total transmission power available for the superposed transmission, which first ratio is to be used for the first signal in the superposed transmission, determine a second ratio of the total transmission power available for the superposed transmission, which second ratio is to be used for the second signal in the superposed transmission, transmit information indicating the first and/or second ratio to at least the first wireless device in the wireless communications network, and perform the superposed transmission to the first and second wireless device simultaneously on the same transmission resources by transmitting the first signal using a transmission power according to the first ratio and by transmitting the second signal using a transmission power according to the second ratio.

According to a third aspect of embodiments herein, the object is achieved by providing a method performed by a first wireless device for handling a superposed transmission from a network node in a wireless communications network. The superposed transmission comprises a first signal intended for the first wireless device and a second signal intended for a second wireless device that are superposed and transmitted simultaneously by the network node on the same transmission resources in the wireless communications network. The first wireless device receives information indicating a first and/or second ratio of the total transmission power available for the superposed transmission, which first ratio is to be used for the first signal and which second ratio is to be used for the second signal in the superposed transmission. Also, the first wireless device receives the superposed transmission. Further, the first wireless device estimates the effective channels associated with the first and second wireless device and the second signal based on the received information and the superposed transmission. Furthermore, the first wireless device processes the first signal intended for the first wireless device using the estimated effective channels associated with the first and second wireless device and the estimated second signal.

According to a fourth aspect of embodiments herein, the object is achieved by providing a first wireless device for handling a superposed transmission from a network node in a wireless communications network. The superposed transmission comprises a first signal intended for the first wireless device and a second signal intended for a second wireless device that are superposed and transmitted simultaneously by the network node on the same transmission resources in the wireless communications network. The first wireless device is configured to receive information indicating a first and/or second ratio of the total transmission power available for the superposed transmission, which first ratio is to be used for the first signal and which second ratio is to be used for the second signal in the superposed transmission, receive the superposed transmission, estimate the effective channels associated with the first and second wireless device and the second signal based on the received information and the superposed transmission, and process the first signal intended for the first wireless device using the estimated effective channels associated with the first and second wireless device and the estimated second signal.

According to a fifth aspect of embodiments herein, the object is achieved by providing a method performed by a second wireless device for handling a superposed transmission from a network node in a wireless communications network. The superposed transmission comprises a first signal intended for the first wireless device and a second signal intended for a second wireless device that are superposed and transmitted simultaneously by the network node on the same transmission resources in the wireless communications network. The second wireless device receives information indicating a second ratio of the total transmission power available for the superposed transmission, which second ratio is to be used for the second signal in the superposed transmission. Also, the second wireless device receives the superposed transmission. Further, the second wireless device estimates the effective channels associated with the second wireless device based on the received information and the superposed transmission. Furthermore, the second wireless device processes the second signal intended for the second wireless device using the estimated effective channel associated with the second wireless device.

According to a sixth aspect of embodiments herein, the object is achieved by providing a second wireless device for handling a superposed transmission from a network node in a wireless communications network. The superposed transmission comprises a first signal intended for the first wireless device and a second signal intended for a second wireless device that are superposed and transmitted simultaneously by the network node on the same transmission resources in the wireless communications network. The second wireless device is configured to receive information indicating a second ratio of the total transmission power available for the superposed transmission, which second ratio is to be used for the second signal in the superposed transmission, receive the superposed transmission, estimate the effective channel associated with the second wireless device based on the received information and the superposed transmission, and process the second signal intended for the second wireless device using the estimated effective channel associated with the second wireless device.

According to a seventh aspect of embodiments herein, the object is achieved by a computer program, comprising instructions which, when executed on at least one processor, cause the at least one processor to carry out the methods described above. According to an eight aspect of embodiments herein, the object is achieved by a carrier containing the computer program described above, wherein the carrier is one of an electronic signal, optical signal, radio signal, or computer readable storage medium.

By selectively signalling, to the first and/or the second wireless device, a determine ratio of transmission power for a first and/or a second signal in an upcoming superposed transmission to both the first and the second wireless device, the first and second wireless device are enabled to perform proper channel estimation for its own signal in the superposed transmission, that is, for the first and second signal respectively, i.e. their respective PDSCH signals in the superposed transmission. In particular, it enables the first wireless device to perform effective channel estimation associated with the second wireless device and the second signal in order to cancel the second signal intended to the second wireless device from the superposed transmission, which allows the first wireless device to obtain the first signal intended to the first wireless device from the superposed transmission.

Hence, superposition transmissions in the wireless communications network is improved.

BRIEF DESCRIPTION OF THE DRAWINGS

Embodiments will now be described in more detail in relation to the enclosed drawings, in which:

FIG. 11 is a schematic overview depicting an example of a 16-QAM superposed constellation in a REMA transmission, FIG. 12 is a schematic overview depicting an example of an OMA/MUST transmission scheduling in a network node, FIG. 16 is a flow chart of embodiments of a method in a network node, FIG. 17 is a flow chart of embodiments of a method in a first wireless device, FIG. 18 is a flow chart of embodiments of a method in a second wireless device, FIG. 23 is a schematic combined flowchart and signalling scheme depicting embodiments of methods in the wireless communications network, FIG. 24 is a schematic overview depicting transmit powers of two wireless devices and transmit power of DMRS in a MUST transmission according to embodiments of a network node and wireless devices, FIG. 25 is a schematic combined flowchart and signalling scheme depicting embodiments of methods in the wireless communications network.

DETAILED DESCRIPTION

The figures are schematic and simplified for clarity, and they merely show details for the understanding of the embodiments presented herein, while other details have been left out.

As part of the developing of the embodiments described herein, a problem will first be identified and discussed.

From the above discussion, it may be determined that the first wireless device, UE1, i.e. the near UE, needs to be able to estimate the following effective (or pre-coded) channels for MUST reception:

$\underline{H}_1 \cdot \sqrt{P_2} \underline{W}_2$, which may be used to remove signal intended for the second wireless device, UE2, i.e. the far UE, from the MUST transmission before decoding its own signal, i.e. the signal intended for the first wireless device, UE1; and $\underline{H}_1 \cdot \sqrt{P_1} \underline{W}_1$: used for decoding its own signal, i.e. the signal intended for the first wireless device, UE1.

From the above discussion, it may also be determined that the second wireless device, UE2, i.e. the far UE, needs to be able to estimate the following effective (or pre-coded) channel for MUST reception:

$\underline{H}_2 \cdot \sqrt{P_2} \underline{W}_2$: used for decoding its own signal, i.e. the signal intended for the second wireless device, UE2.

Here, it should be noted that for the second wireless device, i.e. the far UE, there is no difference between OMA and MUST reception. Channel estimation is typically done through Reference Signals, RS. In LTE, for example, either CRS or DMRS is used for this purpose. A MUST transmission should be supported in both CRS based and DMRS based transmission modes.

CRS Based Transmission Modes

In case of CRS based transmission modes, the channel estimation for demodulation is performed via CRS. First, the channel experienced on the CRS REs at a wireless device is estimated. The estimated channel may be denoted as $H^{CRS}$ Hence, the channel experienced by the data channel (i.e. PDSCH) on an RE with transmit power P and precoder W may then be estimated by the wireless device as shown in Eq. 6:

$$H \cdot \sqrt{P} W = \sqrt{\frac{P}{P_{CRS}}} W f(H^{CRS}) = \sqrt{\rho} W f(H^{CRS}) \qquad \text{(Eq. 6)}$$

where $P_{CRS}$ is the CRS transmit power,
$f( )$ is a linear filtering function, and $$\rho = \frac{P}{P_{CRS}}$$

is the transmit power ratio between the data and the CRS.

In regular OMA transmissions, $\rho$ may be derived from a semi-statically signalled parameter $P_A$. Also, W may either be predefined (e.g. TM2 and TM3) or signalled to the wireless device dynamically in each sub-frame (e.g. TM4, TM5, TM6).

Figure 1:
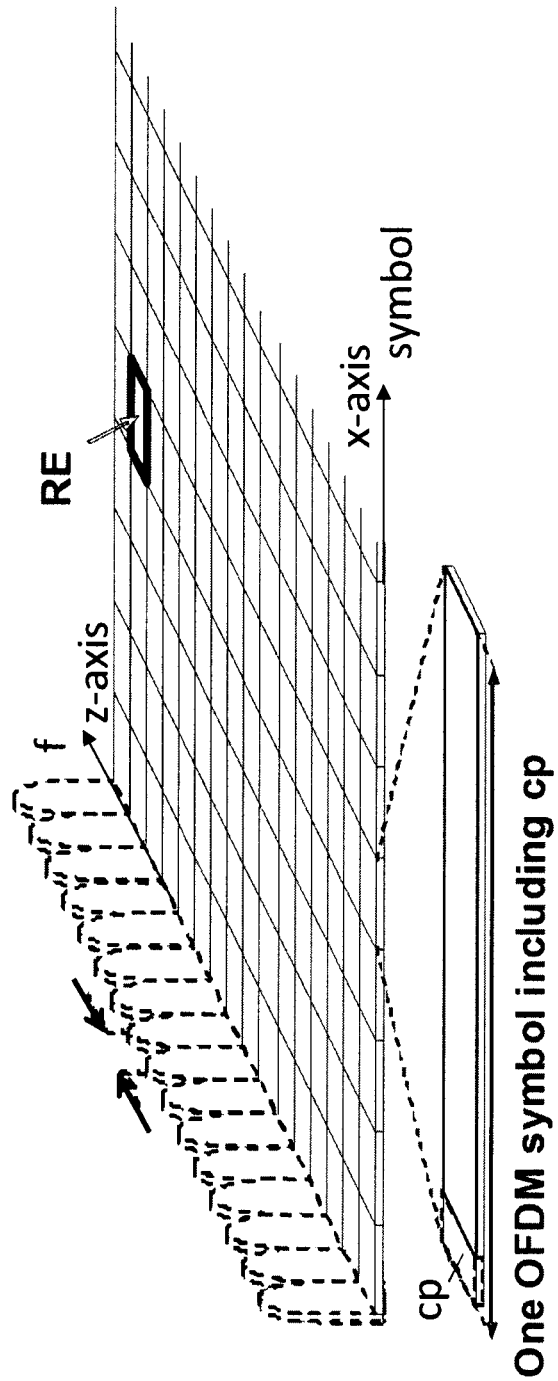
FIG. 1 is a schematic block diagram of a LTE downlink physical resource.
Figure 2:
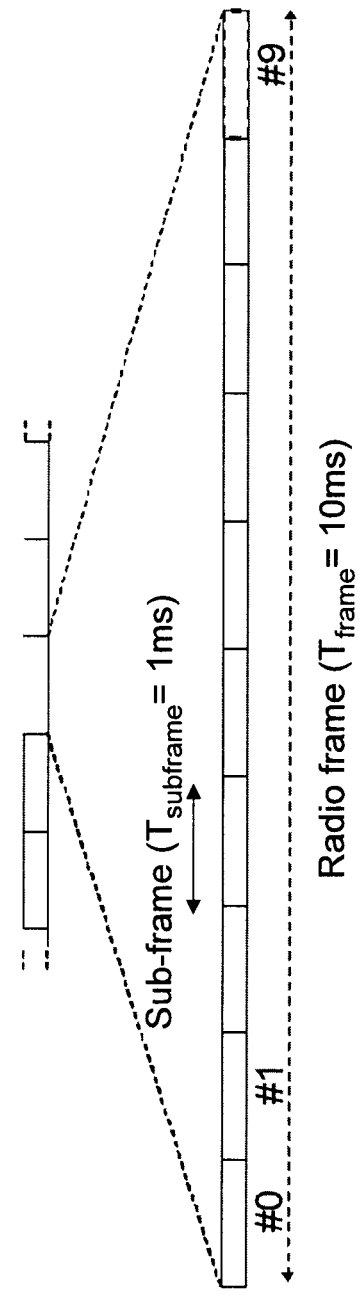
FIG. 2 is a schematic overview depicting radio frames.
Figure 3:
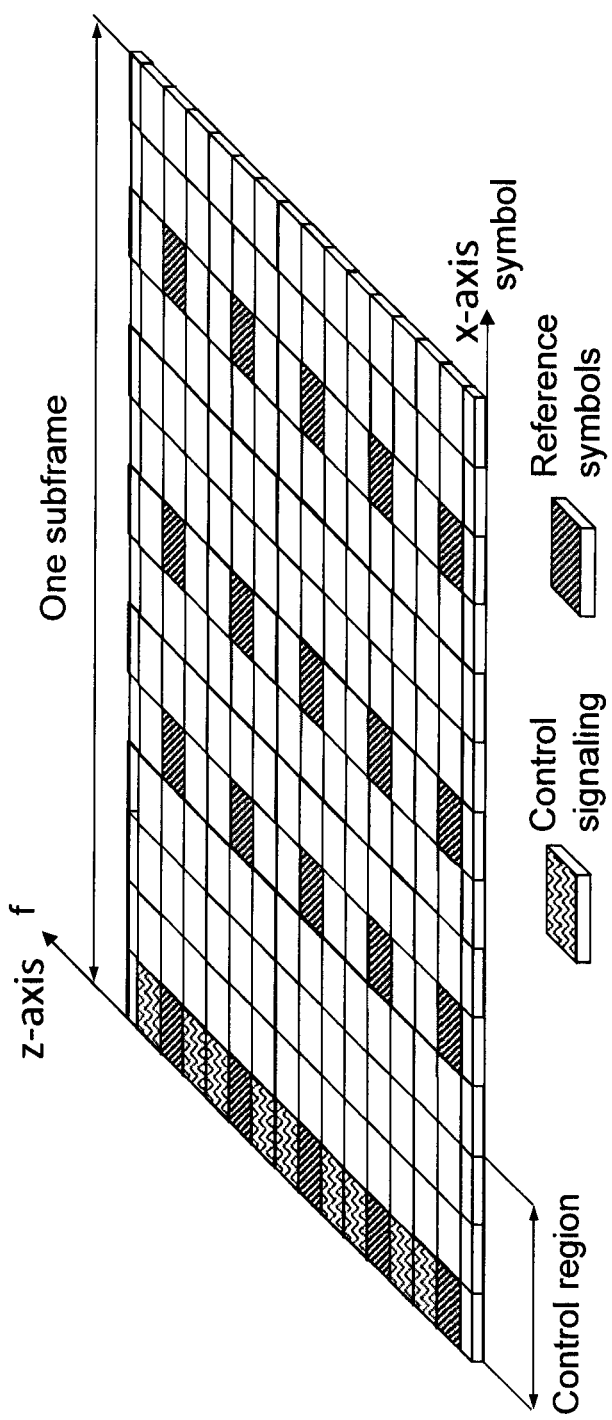
FIG. 3 is a schematic overview depicting a DL subframe.
Figure 4:
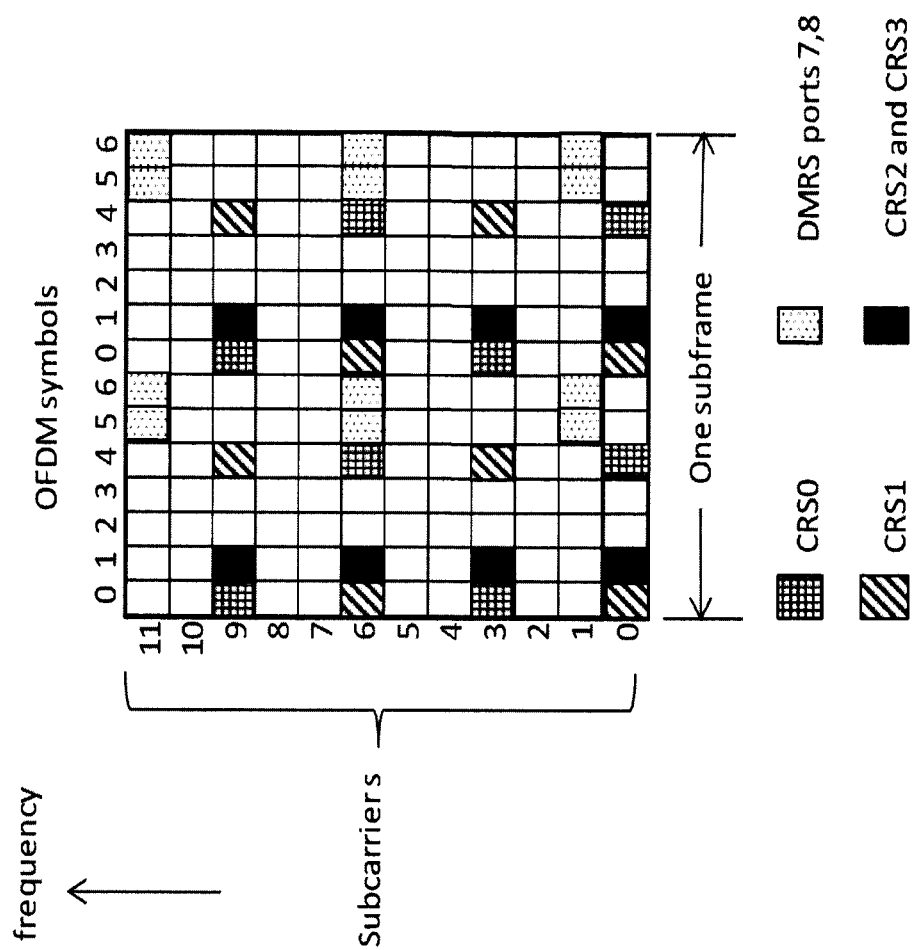
FIG. 4 is a schematic overview depicting CRS and DMRS patterns in LTE.
Figure 5:
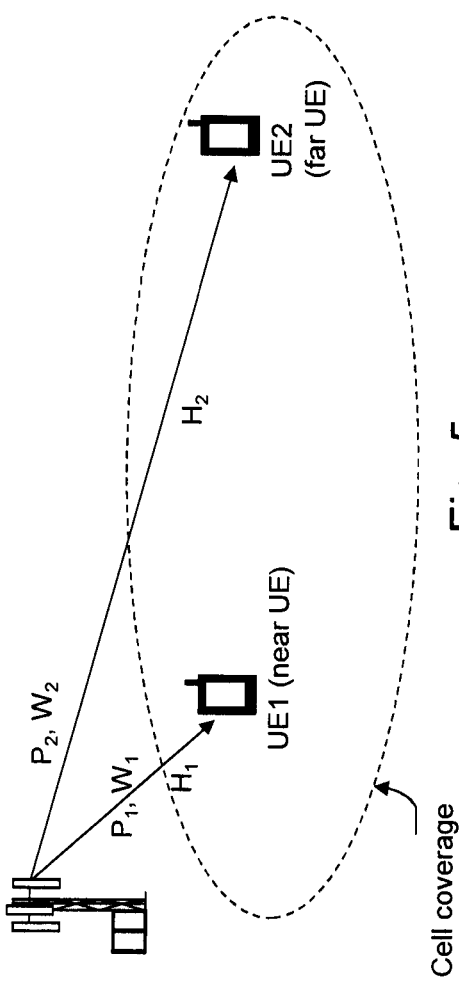
FIG. 5 shows a schematic example of a wireless device pair in a MUST transmission.
Figure 6:
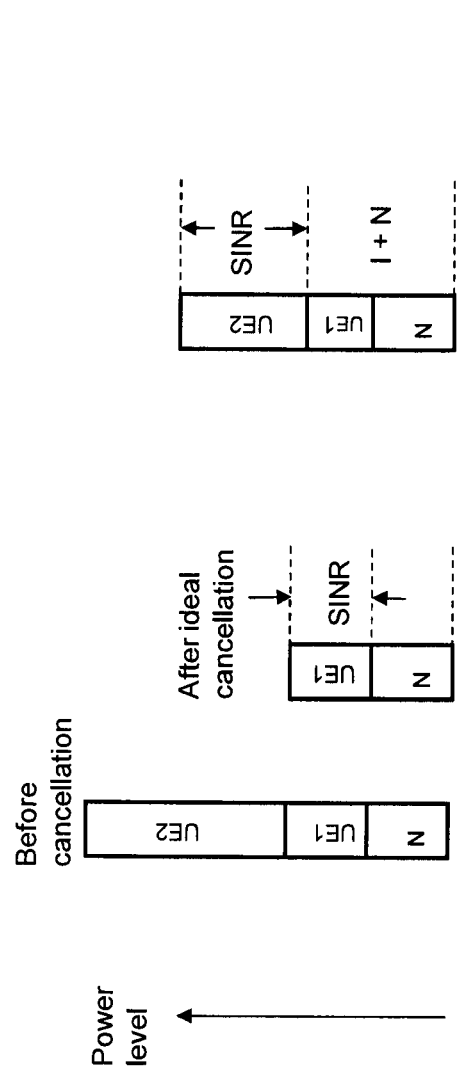
FIG. 6 shows a schematic example of received signals in a MUST transmission at the wireless devices in the example of FIG. 5.
Figure 7:
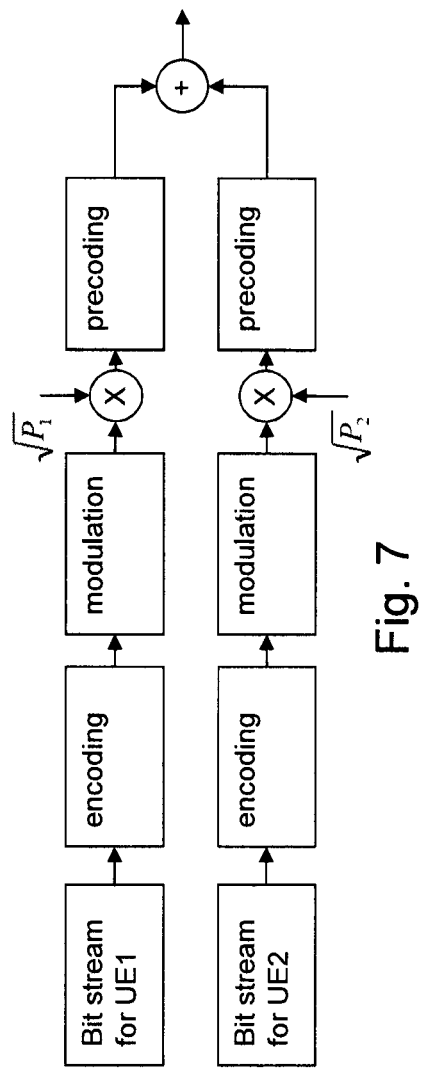
FIG. 7 is a schematic overview depicting an example of a MUST transmitter.
Figure 8:
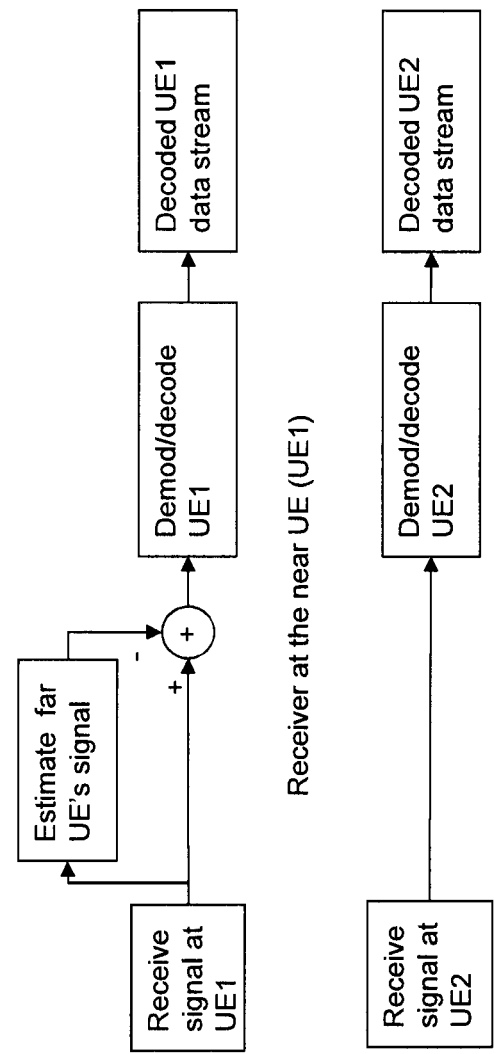
FIG. 8 is a schematic overview depicting an example of a MUST receiver.
Figure 10:
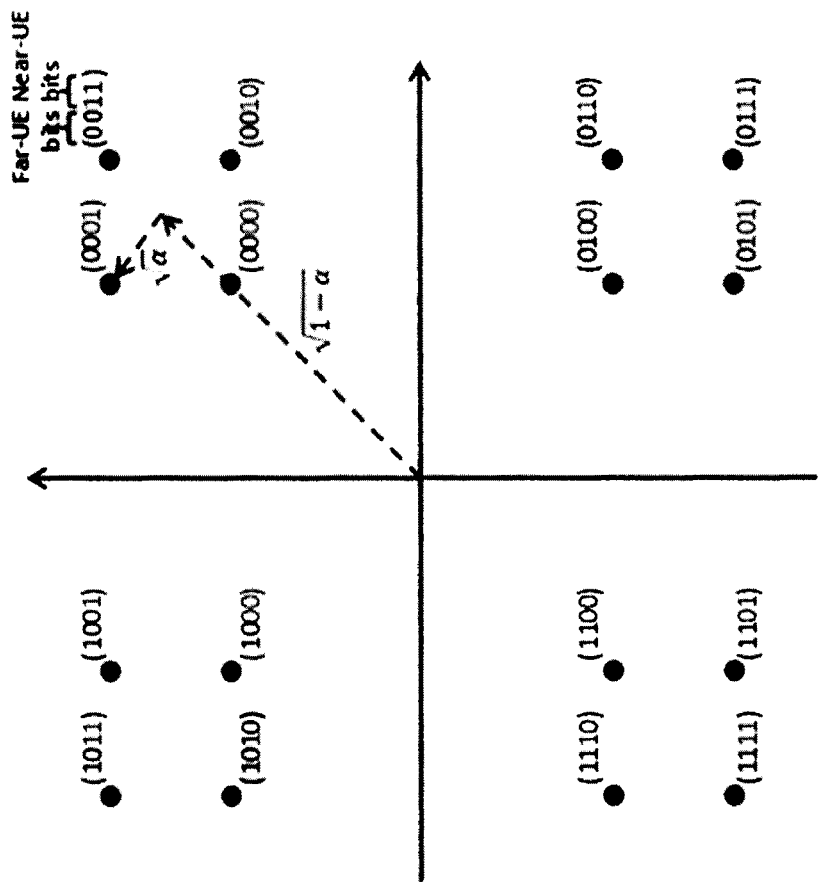
FIG. 10 is a schematic overview depicting an example of a superposed constellation in a SOMA transmission.
Figure 9:
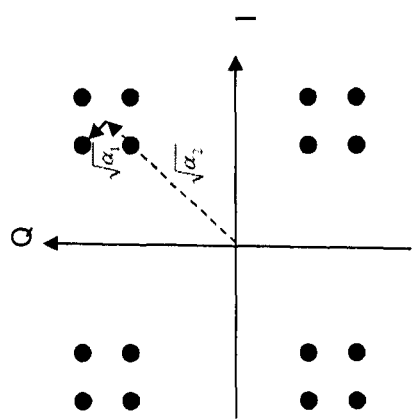
FIG. 9 is a schematic overview depicting an example of a superposed constellation in a NOMA transmission.
Figure 13:
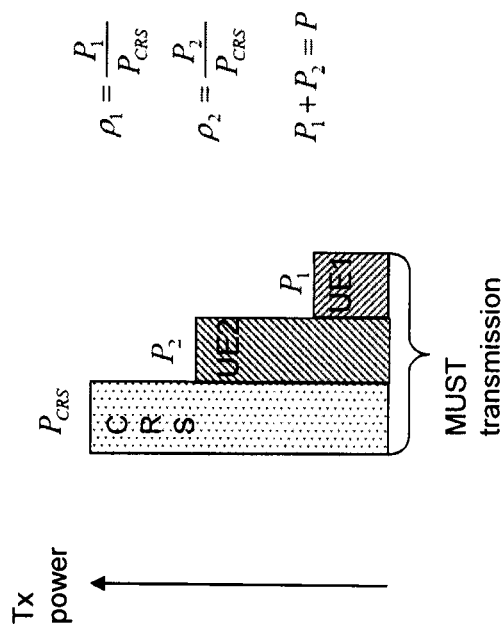
FIG. 13 is a schematic overview depicting transmit powers of two wireless devices in a MUST transmission.

However, in a MUST transmission, two wireless devices are scheduled simultaneously in or on the same time-frequency resources, e.g. on the same REs. The transmit power of CRS, the transmit power of the PDSCH of the near UE, i.e. the first wireless device, UE1, and the transmit power of the PDSCH of the far UE, i.e. second wireless device, UE2, are illustrated in FIG. 13.

For the near UE, i.e. the first wireless device, UE1, the effective channels may be estimated from the CRS as shown in Eq. 7-8:

$$H_1 \cdot \sqrt{P_1} W_1 = f(H_1^{CRS}) \sqrt{\frac{P_1}{P_{CRS}}} W_1 = \sqrt{\rho_1} W_1 f(H_1^{CRS}) \qquad \text{(Eq. 7)}$$

$$H_1 \cdot \sqrt{P_2} W_2 = f(H_1^{CRS}) \sqrt{\frac{P_2}{P_{CRS}}} W_2 = \sqrt{\rho_2} W_2 f(H_1^{CRS}) \qquad \text{(Eq. 8)}$$

where $\rho_1 = \frac{P_1}{P_{CRS}}$ and $\rho_2 = \frac{P_2}{P_{CRS}} = 1 - \rho_1$.

For the far UE, i.e. the second wireless device, UE2, its own effective channel may be estimated as shown in Eq. 9:

$$H_2 \cdot \sqrt{P_2} W_2 = f(H_2^{CRS}) \sqrt{\frac{P_2}{P_{CRS}}} W_2 = \sqrt{\rho_2} W_2 f(H_2^{CRS}) \qquad \text{(Eq. 9)}$$

Based on the above discussion, it is observed that the near UE, i.e. the first wireless device, UE1, requires $\rho_2$ and $W_2$ in order to be able to estimate the effective channel $H_1 \cdot \sqrt{P_2} W_2$ associated to the far UE, i.e. the second wireless device, UE2. Further, it is also observed that the near UE, i.e. the first wireless device, UE1, also requires $\rho_1$ to estimate $\underline{H}_1 \cdot \sqrt{P_1} \underline{W}_1$ (where today, $W_1$ is currently signalled to the first wireless device, UE1), but since $\rho_1 = 1 - \rho_2$, it may be derived from $\rho_2$. Furthermore, it is also observed that far UE, i.e. the second wireless device, UE2, requires $\rho_2$ to be able to estimate $\underline{H}_2 \cdot \sqrt{P_2} \underline{W}_2$ (where today, $W_2$ is currently signalled to the second wireless device, UE2).

Currently in LTE and CRS based modes, $W_1$ and $W_2$ are dynamically signalled to the first and second wireless devices, UE1 and UE2, respectively, at each scheduling time. Thus, the existing signalling mechanism may also be used for signalling $W_1$ to the first wireless device, UE1, and $W_2$ to the second wireless device, UE2, in a MUST transmission. However, in the case where different pre-coders are used for the near and far UEs, i.e. the first and second wireless devices, UE1 and UE2, the current LTE signalling does not support signalling of $W_2$ to the first wireless devices, UE1.

The transmit power to a wireless device during a regular OMA transmission is implicitly signalled to the wireless device by using the parameter $P_A$. This parameter cannot be used, however, for deriving $\rho_1$ or $\rho_2$ during a MUST transmission. The reason for this is that the transmit powers to the two wireless devices during regular OMA transmissions may be different, i.e. different $P_A$ values may be configured to the two wireless devices. This may be due to e.g. downlink power control. Also, the total transmit power during a MUST transmission may not be the same as the total transmit power during the regular OMA transmission. This is shown in FIG. 14.

Figure 14:
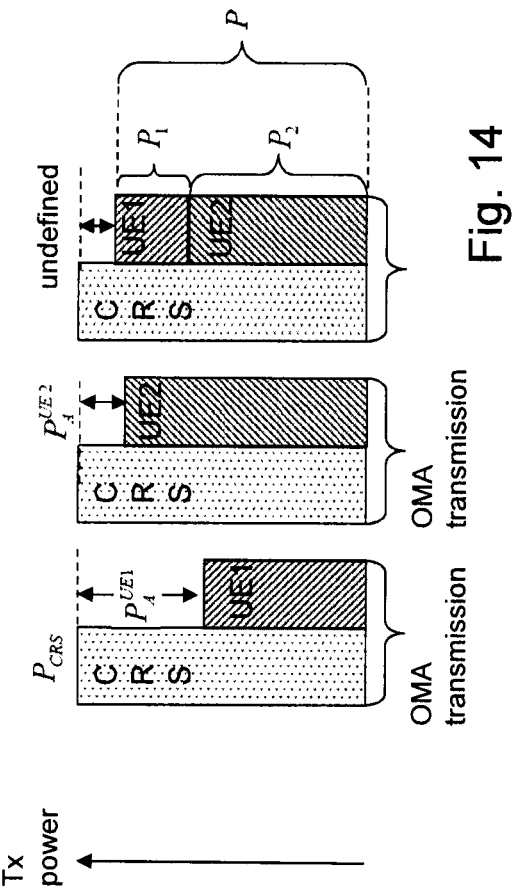
FIG. 14 is a schematic overview depicting transmit powers of two wireless devices in an OMA and a MUST transmission.

It may be seen in FIG. 14 that the total transmit power P of MUST transmission cannot be derived from the $P_A$ values configured for the two wireless devices. This is because a wireless device may be scheduled with a MUST transmission in a subset of sub-frames and regular OMA transmission in the rest of the sub-frames. This means that the wireless device generally cannot use its configured $P_A$ to derive $\rho_1$ or $\rho_2$ during a MUST transmission. In addition, $\rho_1$ or $\rho_2$ may vary from one sub-frame to another as different wireless devices may be paired for MUST transmission, whereas $P_A$ is often configured semi-statically.

DMRS Based Transmission Modes

In case of DMRS based transmission modes, channel estimation is based on a UE specific reference signal, i.e. DMRS. DMRS is pre-coded using the same antenna elements, i.e. pre-coder, and the same transmit power as that for the associated PDSCH data. Also, a PDSCH may be transmitted over one or multiple layers, each layer is associated with a DMRS port.

For a MUST transmission, two wireless devices share the same time-frequency resource and share the same DMRS ports.

In a first scenario, both signals to the first and the second wireless devices, UE1 and UE2, are single layer transmissions and thus share a single DMRS port with a pre-coder W. In this case, the DMRS may be transmitted with a transmit power that is equal to the total transmit powers of the first and the second wireless devices, UE1 and UE2. For example, let DMRS $H_i^{DMRS}$ (i=1,2) be the channel estimation over the DMRS REs at UE i, then the effective channels at a PDSCH data RE may be estimated at the first wireless device, UE1, as shown in Eq. 10-11:

$$\underline{H_1} \cdot \sqrt{P_1} \underline{W} = \sqrt{\frac{P_1}{P}} f(H_1^{DMRS}) = \sqrt{\alpha_1} f(H_1^{DMRS}) \quad \text{(Eq. 10)}$$

$$\underline{H_1} \cdot \sqrt{P_2} \underline{W} = \sqrt{\frac{P_2}{P}} f(H_1^{DMRS}) = \sqrt{\alpha_2} f(H_1^{DMRS}) \quad \text{(Eq. 11)}$$

where $\alpha_1 = \frac{P_1}{P}$ is a first ratio, $\alpha_2 = \frac{P_2}{P}$ is a second ratio, $P = P_1 + P_2$ is the total combined transmit power of the first and the second wireless devices, UE1 and UE2, and $f()$ is a linear filtering function.

Similarly, for the second wireless devices, UE2, the effective channels at the PDSCH data RE may be estimated as shown in Eq. 12:

$$\underline{H_2} \cdot \sqrt{P_2} \underline{W} = \sqrt{\frac{P_2}{P}} f(H_2^{DMRS}) = \sqrt{\alpha_2} f(H_2^{DMRS}) \quad \text{(Eq. 12)}$$

In this scenario, and based on the above discussion, it is observed that the near UE, i.e. the first wireless device, UE1, requires $\alpha_2$ in order to be able to estimate $H_1 \sqrt{P_2} W$. The near UE, i.e. the first wireless device, UE1, also requires $\alpha_1$ in order to be able to estimate $H_1 \sqrt{P_1} W$. However, since $\alpha_1 = 1 - \alpha_2$, the latter may be derived from $\alpha_2$. So, in reality, only one of them is required. Further, it is also observed that the far UE, i.e. the second wireless devices, UE2, requires $\alpha_2$ to estimate $\underline{H_2} \sqrt{P_2} \underline{W}$.

In a second scenario, the signal to the first wireless devices, UE1, is a two layer transmission (also referred to as a dual layer transmission) and the signal to the second wireless devices, UE2, is a single layer transmission. In this scenario, two DMRS ports (e.g. ports 7 & 8) are required. For example, port 7 may be shared by the first and second wireless devices, UE1 and UE2, for their first layer transmissions, while port 8 may be used by the first wireless device, UE1, for its second layer transmission. The received signal at UE i during a MUST transmission may then be given according to Eq. 13:

$$\underline{y_i} = \underline{H_i}\underline{x} + \underline{v_i} = \underline{H_i}(\sqrt{P_{11}}\underline{W}_1 s_{11} + \sqrt{P_{12}}\underline{W}_2 s_{12} + \sqrt{P_2}\underline{W}_1 s_2) + \underline{v_i} \quad \text{(Eq. 13)}$$

where $s_{11}$ and $s_{12}$ are respectively the transmitted signals to the first wireless device, UE1, at the $1^{st}$ and the $2^{nd}$ layer, $P_{11}$ and $P_{12}$ are the corresponding transmit power for the $1^{st}$ and the $2^{nd}$ layer of the first wireless device, UE1.

In this case, the total transmission power of the first and second wireless devices, UE1 and UE2, needs to be split between the two DMRS ports.

Thus, based on the above discussions, it may be concluded that one issue is how to ensure that the wireless devices knows the correct power setting parameters (i.e. the power control) to be able to demodulate the PDSCH, i.e. its intended signal, in case of a MUST transmission. In addition, for the DMRS based transmission modes, another issue is how to allocate transmit power to DMRS ports when rank 1 transmissions (i.e. single layer) and rank 2 transmissions (i.e. two or dual layers) are mixed in a MUST transmission pairing of wireless devices.

These issues are addressed by embodiments described herein, which are exemplified and explained in more detail below with reference to the FIGS. 15-42.

Figure 15:
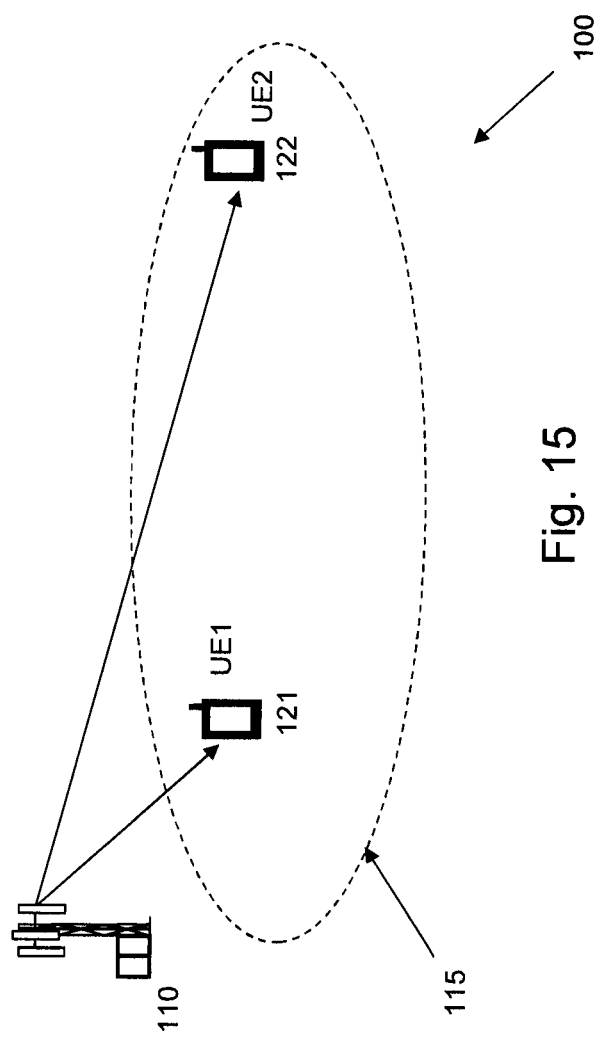
FIG. 15 is a schematic overview depicting embodiments of a network node and wireless devices in a wireless communications network.

FIG. 15 depicts a wireless communications network 100 in which embodiments herein may be implemented. In some embodiments, the wireless communications network 100 may be a wireless communications network such as a Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system. The wireless communication network 100 is exemplified herein as an LTE network.

The wireless communications system 100 comprises a network node 110. The network node 110 serves at least one cell 115. The network node 110 may e.g. be a base station, a radio base station, eNB, eNodeB, a Home Node B, a Home eNode B, femto Base Station (BS), pico BS or any other network unit capable to capable of communicating with a wireless device within the cell served by the network node depending e.g. on the radio access technology and terminology used. The network node 110 may also be e.g. a base station controller, a network controller, a relay node, a repeater, an access point, a radio access point, a Remote Radio Unit (RRU) or a Remote Radio Head (RRH).

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. The network node 110 communicates over the air or radio interface operating on radio frequencies with the wireless devices within range of the network node 110.

In FIG. 15, a first wireless device 121 and a second wireless device 122 is located within the cell 115. The first and second wireless devices 121, 122 are configured to communicate within the wireless communications network 100 via the network node 110 over a radio link 131 when present in the cell 115 served by the network node 110. The first and second wireless devices 121, 122 may e.g. be any kind of wireless devices such as mobile phones, cellular phones, Personal Digital Assistants (PDAs), a smart phones, tablets, sensors equipped with wireless devices, Laptop Mounted Equipments (LMEs) (e.g. USBs), Laptop Embedded Equipments (LEEs), Machine Type Communication (MTC) devices, or Machine to Machine (M2M) devices, Customer Premises Equipments (CPEs), etc.

The first wireless devices 121 is located at a first distance from the network node 110 and the second wireless devices 122 is located at a second distance from the network node 110, wherein the first distance is shorter than the second distance. Hence, the first wireless device 121 may also be referred to as a cell-centre wireless device or near UE, while the second wireless device 122 may also be referred to as a cell-edge wireless device or a far UE.

It should also be noted that distance may here also refer to radio distance, not only geographical distance. For example, if the first wireless devices 121 is an indoor UE and the second wireless devices 122 is an outdoor UE, then the first wireless devices 121 is likely to have a higher propagation loss. In this case, it is possible for the first wireless devices 121 to become the far UE (i.e. the second wireless device 122 as referred to hereinafter) and the second wireless devices 122 to become the near UE (i.e. the first wireless device 121 as referred to hereinafter).

Example of embodiments of a method performed by the network node 110 for performing a superposed transmission in the wireless communications network 100. The superposed transmission may comprise a first signal intended for a first wireless device 121 from the network node 110 and a second signal intended for a second wireless device 122 from the network node 110 that are superposed and transmitted simultaneously by the network node 110 on the same transmission resources in the wireless communications network 100. According to some embodiments, the same transmission resources may be the same time- and frequency transmission resources in the wireless communications network 100.

FIG. 16 is an illustrated example of actions or operations which may be taken or performed by the network node 110. The method may comprise the following actions.

Action 1601

The network node 110 determines a first ratio of the total transmission power, P, available for the superposed transmission, which first ratio is to be used for the first signal in the superposed transmission.

Action 1602

Here, the network node 110 also determines a second ratio of the total transmission power, P, available for the superposed transmission, which second ratio is to be used for the second signal in the superposed transmission.

In some embodiments, the first ratio may be uniformly quantized within the range between 0 and 0.5, and the second ratio is uniformly quantized with the range between 0.5 and 1. Optionally, in some embodiments, the first ratio may be non-uniformly quantized within the range between 0 and 0.5 and the second ratio may be non-uniformly quantized with the range between 0.5 and 1.

Action 1603

Then, the network node 110 transmits information indicating the first and/or second ratio to at least the first wireless device 121 in the wireless communications network 100.

In some embodiments, the network node 110 may transmit the information indicating the second ratio to the second wireless device 122. Optionally, in some embodiments, the network node 110 may transmit the information indicating the first and/or second ratio to the first wireless device 121 only. Also, in some embodiments, the information indicating the first and/or second ratio may be signaled dynamically through a Physical Downlink Control Channel, PDCCH, or an Enhanced Physical Downlink Control Channel, EPDCCH. Alternatively, the information indicating the first and/or second ratio may be signaled semi-statically through Radio Resource Control, RRC, messages. Furthermore, according to some embodiments, the information indicating the first and/or second ratio may be signaled explicitly using a number of predetermined bits, wherein each predetermined bit indicates a particular ratio.

In some embodiments, when the network node 110 is configured to perform the superposed transmission using a transmission mode comprising Cell-specific Reference Signals, CRS, the network node 110 may transmit information indicating a third ratio. The third ratio may be the ratio between the average transmission power available for the superposed transmission per Resource Element, RE, in the Orthogonal Frequency Division Multiplexing, OFDM, grid not comprising CRS, and the average CRS transmission power per RE. Optionally, in this case, the network node 110 may transmit information indicating that the same ratio between the average transmission power available for Physical Downlink Shared Channel, PDSCH, transmissions per RE in the OFDM grid and the average CRS transmission power per RE is to be used by to the first and second wireless device 121, 122. Here, the network node 110 may also transmit information indicating that the same ratio between the average transmission power available for the superposed transmission per RE in the OFDM grid not comprising CRS and the average CRS transmission power per RE is to be used by to the first and second wireless device 121, 122, and transmit information indicating that the same ratio between the average transmission power available for non-superposed PDSCH transmissions per RE in the OFDM grid and the average CRS transmission power per RE is to be used by to the first and second wireless device 121, 122.

Action 1604

Further, the network node 110 performs the superposed transmission to the first and second wireless device 121, 122 simultaneously on the same transmission resources by transmitting the first signal using a transmission power according to the first ratio and by transmitting the second signal using a transmission power according to the second ratio. In some embodiments, the network node 110 may transmit the second signal as single layer transmission with QPSK modulation.

In some embodiments, when the network node 110 is configured to perform the superposed transmission using a transmission mode comprising Demodulation Reference Signals, DMRS, the network node 110 may perform the superposed transmission with equal transmission powers on the antenna ports used by the DMRS.

Optionally, when the network node 110 is configured to perform the superposed transmission using a transmission mode comprising DMRS, the network node 110 may according to some embodiments set the transmission power of the DMRS to correspond to the total transmission power, P, available for the superposed transmission. This may be performed when the first and second signal are both single layer transmissions in the superposed transmission. According to another option, when the network node 110 is configured to perform the superposed transmission using a transmission mode comprising DMRS, the network node 110 may according to some embodiments set the transmission power of the DMRS to the transmission power used for Physical Downlink Shared Channel, PDSCH, transmissions to the second wireless device 122. This may also be performed when the first and second signal are both single layer transmissions in the superposed transmission.

Further, when the first signal is a dual layer transmission and the second signal is a single layer transmission in the superposed transmission and when the network node 110 is configured to perform the superposed transmission using a transmission mode comprising DMRS, the network node 110 may according to some embodiments set the transmission power of the DMRS on each layer so as to correspond to the total transmission power used for PDSCH transmissions to the first and second wireless device 121, 122 on the respective layer. Here, the network node 110 may also set the transmission power of the DMRS on each layer to correspond to half the total transmission power, P, available for the superposed transmission, and/or set the transmission power of the DMRS on the single layer of the second signal to correspond to the transmission power used for PDSCH transmissions to the second wireless device 122, and set the transmission power of the DMRS on the other layer of the dual layer of the first signal to correspond to the remaining power of the total transmission power, P, available for the superposed transmission.

Furthermore, when the network node 110 is configured to perform the superposed transmission using a transmission mode comprising DMRS, the network node 110 may according to some embodiments set the transmission power of the DMRS to correspond to half the total transmission power, P, available for the superposed transmission.

Also, when the network node 110 is configured to perform the superposed transmission using a transmission mode comprising DMRS, the network node 110 may according to some embodiments set the transmission power of the DMRS in each layer to correspond to the transmission power used for PDSCH transmissions to the second wireless device 122 on the corresponding layer.

Example of embodiments of a method performed by the first wireless device 121 for handling a superposed transmission from a network node 110 in a wireless communications network 100. The superposed transmission comprises a first signal intended for the first wireless device 121 from the network node 110 and a second signal intended for a second wireless device 122 from the network node 110 that are superposed and transmitted simultaneously by the network node 110 on the same transmission resources in the wireless communications network 100.

FIG. 17 is an illustrated example of actions or operations which may be taken or performed by the first wireless device 121, i.e. near UE or UE1. The method may comprise the following actions.

Action 1701

First, the first wireless device 121 receives information indicating a first and/or second ratio of the total transmission power, P, available for the superposed transmission, which first ratio is to be used for the first signal and which second ratio is to be used for the second signal in the superposed transmission.

In some embodiments, when the network node 110 is configured to perform the superposed transmission using a transmission mode comprising CRS, the first wireless device 121 may receive information indicating a third ratio between the average transmission power available for the superposed transmission per RE in the OFDM grid not comprising CRS, and the average CRS transmission power per RE.

Optionally, in some embodiments, when the network node 110 is configured to perform the superposed transmission using a transmission mode comprising CRS, the first wireless device 121 may receive information indicating a ratio between the average transmission power available for Physical Downlink Shared Channel, PDSCH, transmissions per RE in the OFDM grid and the average CRS transmission power per RE that is to be used by the first wireless device 121. In this case, the first wireless device 121 may further receive information indicating a ratio between the average transmission power available for the superposed transmission per RE in the OFDM grid not comprising CRS and the average CRS transmission power per RE that is to be used by the first wireless device 121, and receive information indicating a ratio between the average transmission power available for non-superposed PDSCH transmissions per RE in the OFDM grid and the average CRS transmission power per RE that is to be used by the first wireless device 121.

Action 1702

After the receiving in Action 1702, the first wireless device 121 receives the superposed transmission.

Action 1703

The first wireless device 121 then estimates the effective channels associated with the first and second wireless device 121, 122 and the second signal based on the received information and the superposed transmission.

Action 1704

After the estimation in Action 1703, the first wireless device 121 processes the first signal intended for the first wireless device 121 using the estimated effective channels associated with the first and second wireless device 121, 122 and the estimated second signal. In some embodiments, the first wireless device 121 may here subtract the estimated second signal from the received superposed transmission to obtain the first signal.

Example of embodiments of a method performed by a second wireless device 122 for handling a superposed transmission from a network node 110 in a wireless communications network 100. The superposed transmission comprises a first signal intended for the first wireless device 121 and a second signal intended for a second wireless device 122 that are superposed and transmitted simultaneously by the network node 110 on the same transmission resources in the wireless communications network 100.

FIG. 18 is an illustrated example of actions or operations which may be taken or performed by the second wireless device 122, i.e. far UE or UE2. The method may comprise the following actions.

Action 1801

First, the second wireless device 122 receives information indicating a second ratio of the total transmission power, P, available for the superposed transmission, which second ratio is to be used for the second signal in the superposed transmission.

In some embodiments, when the network node 110 is configured to perform the superposed transmission using a transmission mode comprising CRS, the second wireless device 122 may receive information indicating a third ratio between the average transmission power available for the superposed transmission per RE in the OFDM grid not comprising CRS and the average CRS transmission power per RE.

Optionally, in some embodiments, when the network node 110 is configured to perform the superposed transmission using a transmission mode comprising CRS, the second wireless device 122 may receive information indicating a ratio between the average transmission power available for Physical Downlink Shared Channel, PDSCH, transmissions per RE in the OFDM grid and the average CRS transmission power per RE that is to be used by the second wireless device 122. In this case, the second wireless device 122 may also receive information indicating a ratio between the average transmission power available for the superposed transmission per RE in the OFDM grid not comprising CRS and the average CRS transmission power per RE that is to be used by the second wireless device 122, and receive information indicating a ratio between the average transmission power available for non-superposed PDSCH transmissions per RE in the OFDM grid and the average CRS transmission power per RE that is to be used by the second wireless device 122.

Action 1802

After the receiving in Action 1802, the second wireless device 122 receives the superposed transmission.

Action 1803

The second device 122 then estimates the effective channel associated with the second wireless device 122 based on the received information and the superposed transmission.

Action 1804

After the estimation in Action 1803, the second wireless device 122 processes the second signal intended for the second wireless device 122 using the estimated effective channel associated with the second wireless device 122. In some embodiments, the second signal may be a single layer transmission with QPSK modulation.

Further details of the embodiments described above will now be described in more detail below with reference to the FIGS. 19-42.

Dynamic Transmit Power Signaling for MUST Transmission: CRS Based Transmission Modes During MUST transmission sub-frames, the total transmit power, P, of the first and second wireless device 121, 122 may be different from the ones configured for OMA transmission. Without signalling P, each of the first and second wireless device 121, 122 would assume a transmit power according to its configured $P_A$ value which is problematic. There are a few possible ways to handle this as is described in the embodiments below.

Figure 19:
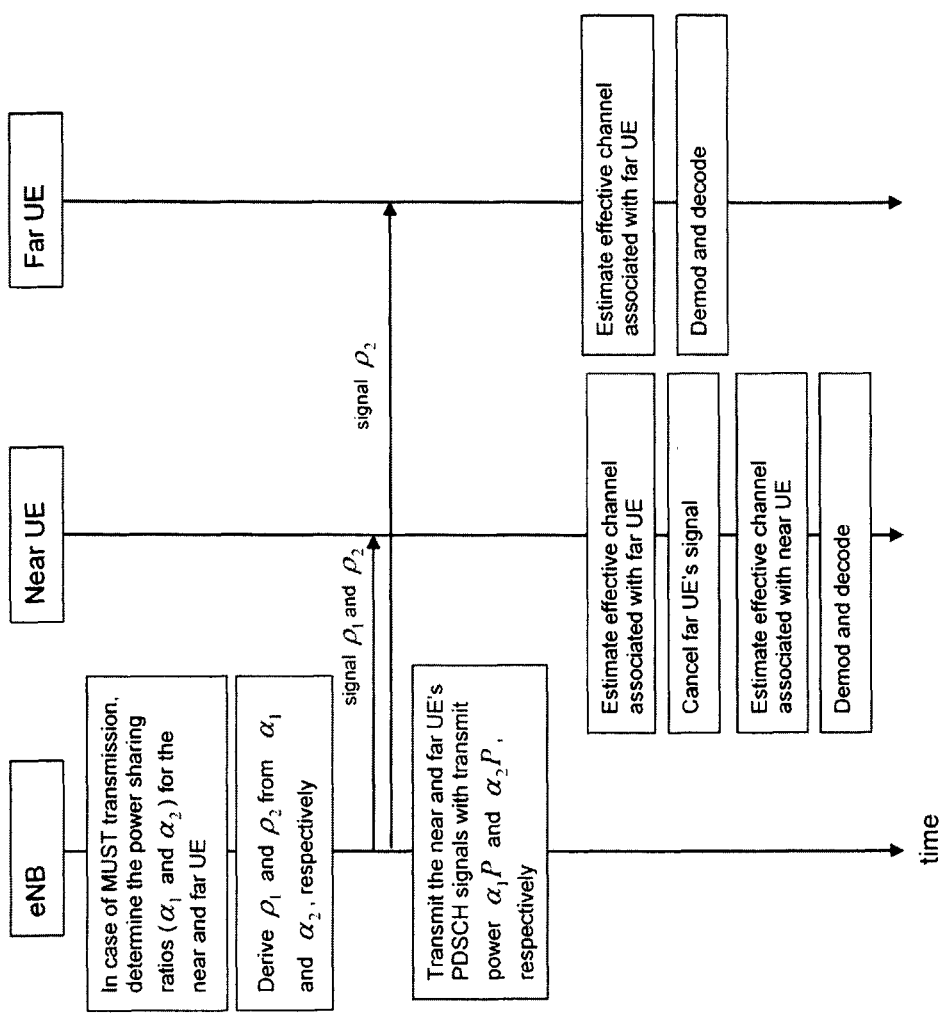
FIG. 19 is a schematic combined flowchart and signalling scheme depicting embodiments of methods in the wireless communications network.

FIG. 19 shows a schematic combined flowchart and signalling scheme according to some embodiments. In these embodiments, the power ratio of $$\rho_i = \frac{P_i}{P_{CRS}} (i = 1, 2)$$

may be explicitly signalled by the network node 110 to the first and second wireless device 121, 122 as follows:
- Both $\rho_1$ and $\rho_2$ are signalled to first wireless device 121, i.e. the near UE;
- $\rho_2$ is signalled to second wireless device 122, i.e. the far UE.

This allows the true transmit power ratio relative to the CRS to be signalled to the the first and second wireless device 121, 122.

However, it should be noted that both $\rho_1$ and $\rho_2$ need to be signalled to the first wireless device 121, i.e. the near UE, which provides a bit more signalling overhead. It should also be noted that, since $\alpha_1$ (or $\alpha_2$) (which is relative to the total power) is used for scheduling MUST transmissions, the network node 110 needs to convert $\alpha_1$ (or $\alpha_2$) to $\rho_1$ (or $\rho_2$) (which is relative to the CRS power), i.e.

$$\rho_i = \alpha_i \frac{P}{P_{CRS}} (i = 1, 2).$$

This may result in a larger range for $\rho_i$ than for $\alpha_i$, depending on the range of P.

For example, if $\alpha_i$ has 4 values and $$\frac{P}{P_{CRS}}$$

has a range of 4 values, then $\rho_i$ would have a range of 16 values. In this example, 4 bits are required to signal $\rho_i$ while only 2 bits are needed for signalling $\alpha_i$.

Figure 20:
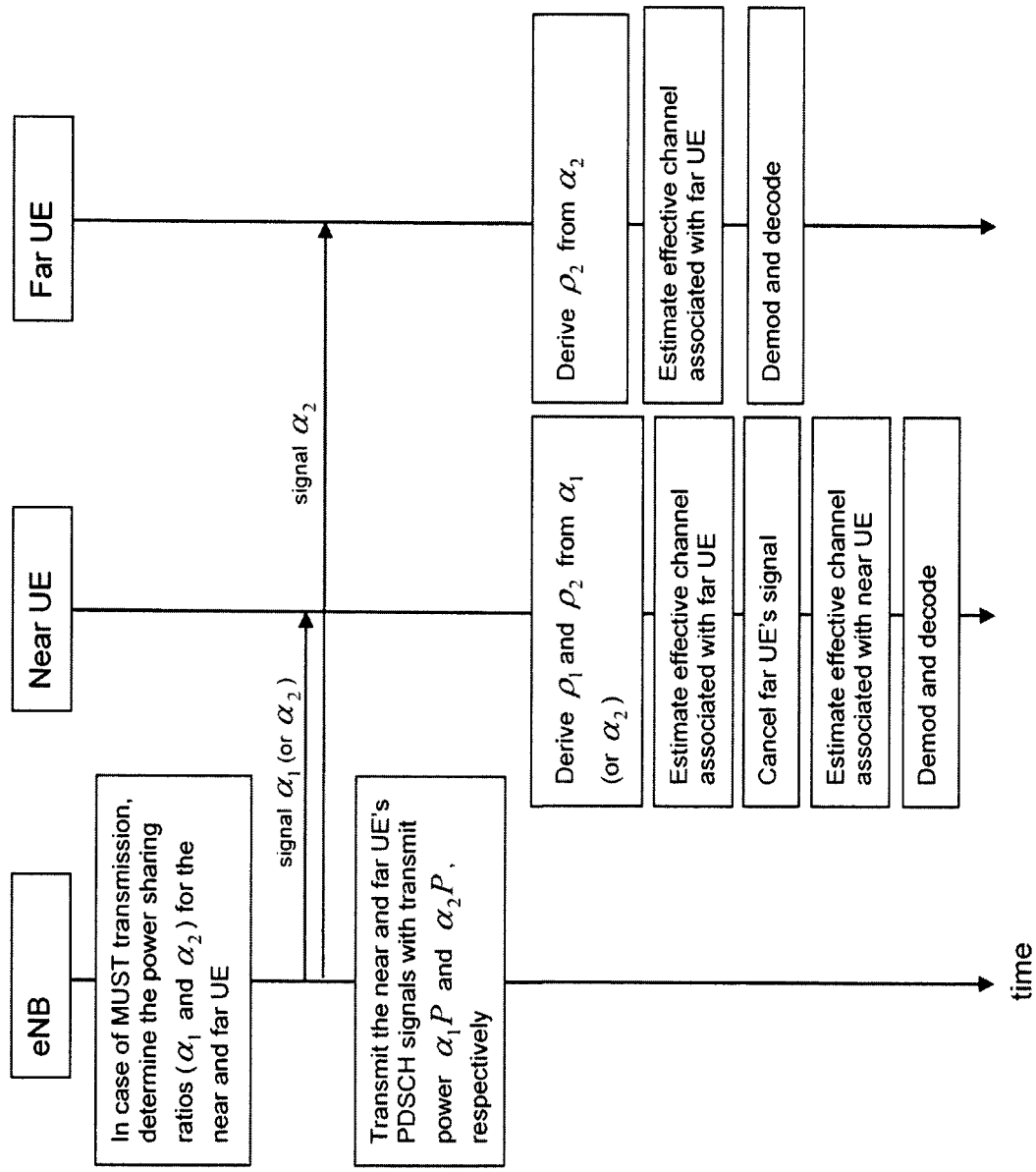
FIG. 20 is a schematic combined flowchart and signalling scheme depicting embodiments of methods in the wireless communications network.
Figure 22:
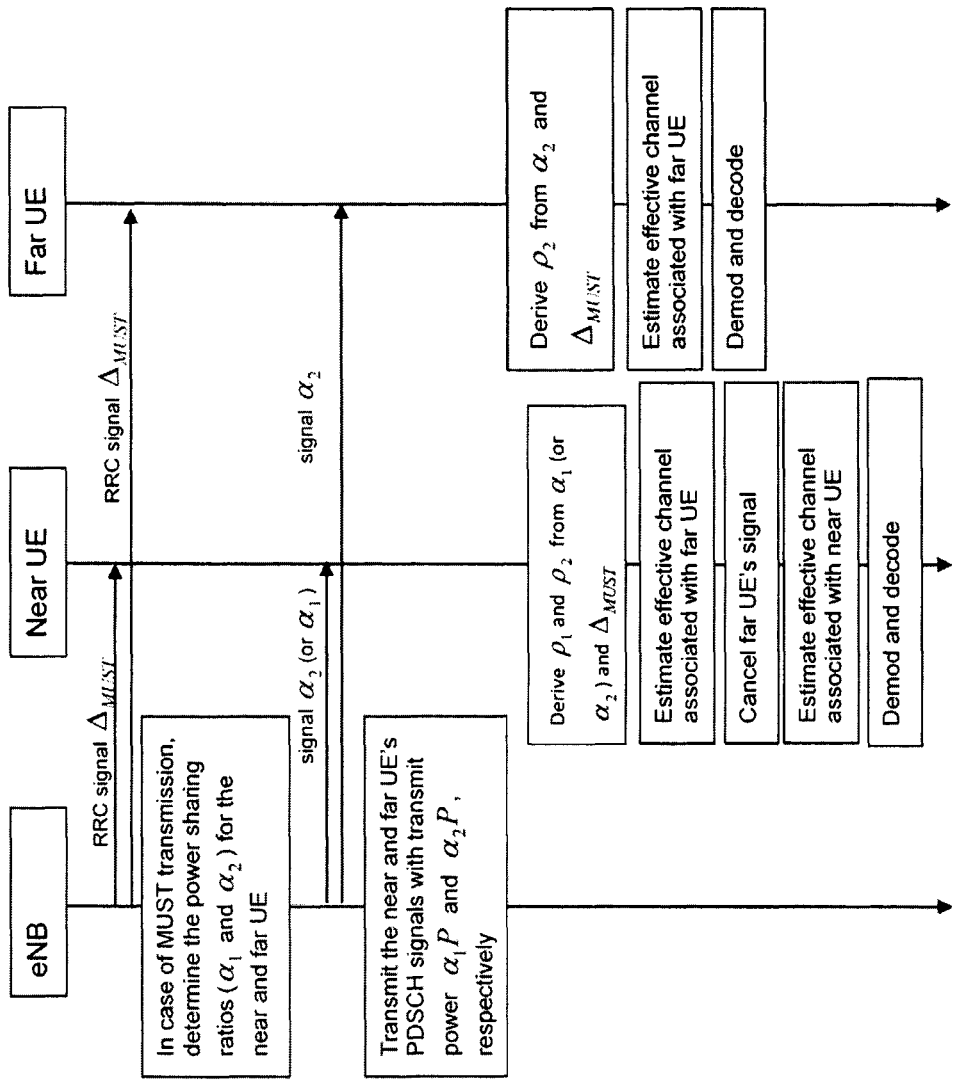
FIG. 22 is a schematic combined flowchart and signalling scheme depicting embodiments of methods in the wireless communications network.

FIG. 20 shows a schematic combined flowchart and signalling scheme according to some embodiments. In these embodiments, both the first and second wireless device 121, 122 are configured with the same $P_A$ value and $$\frac{P}{P_{CRS}} = P_A.$$

Then, transmit power sharing ratio $\alpha_1$ (or $\alpha_2$) is signalled to the first wireless device 121 and $\alpha_2$ to the second wireless device 122. In this case, the MUST transmit power for the first and second wireless device 121, 122 may be obtained as follows:

The first wireless device 121: $\rho_1 = \alpha_1 P_A$ and $\rho_2 = (1-\alpha_1) P_A$;
The second wireless device 122: $\rho_2 = \alpha_2 P_A$ However, since the network node 110 doesn't know which the pairing UEs, i.e. the first and second wireless device 121, 122, are before MUST scheduling and the paired UEs may change from sub-frame to sub-frame, the network node 110 may configure the same $P_A$ to all wireless devices.

According to some embodiments, the network node 110 may transmit $$\alpha_i \frac{P}{P_{OMA}^i}$$

to the UE i, i.e. the first and second wireless device 121, 122, respectively, and the first and second wireless device 121, 122 may calculate its PDSCH to CRS transmit power ratio, $\rho_i$, for MUST transmission as in Eq. 14:

$$\rho_i = \frac{\alpha_i P}{P_{CRS}} = \alpha_i \frac{P}{P_{OMA}^i} \cdot \frac{P_{OMA}^i}{P_{CRS}} = \alpha_i \frac{P}{P_{OMA}^i} P_A^{UEi} \quad \text{(Eq. 1)}$$

where $P_A^{UEi}$ is the configured $P_A$ for UE i.

This is because the first and second wireless device 121, 122 already is signalled with $P_A = P_{OMA}/P_{CRS}$ for regular OMA transmission, where $P_{OMA}$ is the PDSCH transmit power during the regular OMA transmission.

As the difference between P (the total PDSCH transmit power in MUST transmission) and $P_{OMA}$ should be small, transmitting $$\alpha_i \frac{P}{P_{OMA}^i}$$

to the first and second wireless device 121, 122 may consume few bits, and thus lead to low signalling overhead.

However, since the first wireless device 121, i.e. the near UE, does not know the OMA transmit power, $P_{OMA}^2$, of the second wireless device 122, i.e. far UE, the first wireless device 121 cannot derive $\rho_2$ unless both $$\alpha_2 \frac{P}{P_{OMA}^2}$$

and $P_A^{UE2}$ are also signalled to the first wireless device 121.

According to some embodiments, the network node 110 may determine a predefined power P for MUST transmission, and a parameter capturing the relative power to CRS, i.e.

$$\Delta_{MUST} = \frac{P}{P_{CRS}}.$$

Figure 21:
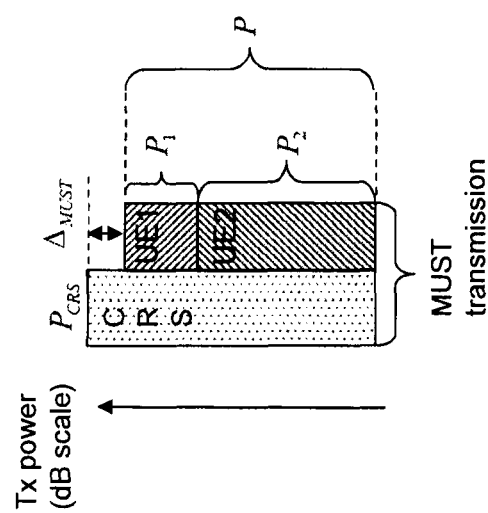
FIG. 21 is a schematic overview depicting transmit powers of two wireless devices and transmit power of CRS in a MUST transmission according to embodiments of a network node and wireless devices.

This is shown in FIG. 21. In FIG. 21, decibel (dB) scale is used. Hence, the network node 110 may transmit $\alpha_1$ (and/or $\alpha_2$), and $\Delta_{MUST}$ to the first and second wireless device 121, 122. In this case, $\Delta_{MUST}$ may be transmitted semi-statically, e.g. by a UE specific RRC signaling or in a broadcast message, and is the same for all wireless devices in a cell, i.e. it is a cell specific parameter.

Furthermore, in this case, the first and second wireless device 121, 122 may obtain the true transmit power during MUST transmission reception based on the transmitted first and/or second ratios $\alpha_1$ or $\alpha_2$ and $\Delta_{MUST}$ may be obtained as follows:

The first wireless device 121: $\rho_i = \alpha_1 \Delta_{MUST}$ and $\rho_2 = (1-\alpha) \Delta_{MUST}$ The second wireless device 122: $\rho_2 = 2\Delta_{MUST}$ Here, $\alpha_1$ and $\alpha_2$ may be transmitted by the network node 110 in each scheduled MUST sub-frame, either explicitly or implicitly. In some embodiments, the same range of $P_A$ may be used for $\Delta_{MUST}$, i.e. [−6, −4.77, −3 dB, −1.77, 0, 1, 2, 3] dB. An example of this is shown by the schematic combined flowchart and signalling scheme according to some embodiments in FIG. 22.

All the embodiments above require signalling to the second wireless device 122, i.e. the far UE. This prevents, for example, a legacy wireless device to be paired as the second wireless device 122, i.e. the far UE, in a MUST transmission. To allow a first wireless device 121, i.e. a near UE, to be paired with a legacy UE, as the second wireless device 122, in a MUST transmission, the network node 110 may schedule the second wireless device 122, i.e. the far UE, with only a single layer and with QPSK modulation. In this case, the transmit power ratio between the PDSCH of the second wireless device 122, i.e. far UE, and the CRS does not need to be signaled to either the first wireless device 121, i.e. a near UE, or the second wireless device 122, i.e. far UE. The MUST transmission is then transparent to the second wireless device 122, i.e. far UE, that is, the second wireless device 122 is un-aware of MUST transmission and will treat the received signal as a regular OMA transmission. An example of this is shown by the schematic combined flowchart and signalling scheme according to some embodiments in FIG. 23.

Transmit Power Allocation and Signaling for MUST Transmission: DMRS Based Transmission Modes In DMRS based transmission modes, e.g. TM9 and TM10, the first and second wireless device 121, 122 does not need to know the actual transmission power because its PDSCH transmit power is the same as the DMRS transmit power. However, this assumption is no longer correct if DMRS is shared by the first and second wireless device 121, 122 and is transmitted with the combined total power.

In a first scenario, both the first wireless device 121 and the second wireless device 122 are rank1 transmissions and share a single DMRS port with a pre-coder W.

In this first scenario, according to some embodiments, the DMRS may be transmitted by the network node 110 with the total transmit power, P, as shown in FIG. 24. Ratio $\alpha_1$ may be transmitted by the network node 110 to the first wireless device 121 (near UE, UE1) and ratio $\alpha_2$ may be transmitted by the network node 110 to the second wireless device 122 (far UE, UE2). In this case, since $\alpha_1 + \alpha_2 = 1$ and $\alpha_2 > \alpha_1$, different ranges are needed for $\alpha_1$ and $\alpha_2$. For example, $\alpha_1 \in \{0.1, 0.2, 0.3, 0.4\}$ and $\alpha_2 \in \{0.9, 0.8, 0.7, 0.6\}$. Since an arbitrary wireless device may be either a near or a far UE, even in different sub-frames, depending on the scheduling, a combined range of $\{0.9, 0.8, 0.7, 0.6, 0.4, 0.3, 0.2, 0.1\}$ may be used for the signaling between the network node 110 and the first and second wireless device 121, 122. For example, 3 bits may be used to indicate a transmit power ratio.

Alternatively, in this first scenario and according to some embodiments, the ratio $\alpha_2$ may be transmitted by the network node 110 to both the first and second wireless device 121, 122, where $\alpha_2 \geq 0.5$. Since the first wireless device 121 (near UE, UE1) will be informed about the MUST transmission in order to perform interference cancellation, the first wireless device 121 may derive $\alpha_1$ from $\alpha_2$ when this ratio is positive, since $\alpha_1 = 1 - \alpha_2$. In this case, for example, a one sided range may be used, e.g. $\alpha_2 \in \{0.9, 0.8, 0.7, 0.6\}$, wherein only 2 bits are required. Alternatively, a finer granularity in $\alpha_2$ may be used if 3 or more bits is used. Examples of the above embodiments in this first scenario is shown by the schematic combined flowchart and signalling scheme in FIG. 25.

Figure 26:
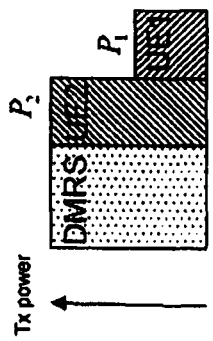
FIG. 26 is a schematic overview depicting transmit powers of two wireless devices and transmit power of DMRS in a MUST transmission according to embodiments of a network node and wireless devices.

Furthermore, in this first scenario and according to some embodiments, the DMRS may be transmitted by the network node 110 with a power equal to the PDSCH power of the second wireless device 122 (far UE, UE2), as shown in FIG. 26. Here, either $\alpha_1$ or $\alpha_2$ may be transmitted by the network node 110 to the first wireless device 121 (near UE, UE1). In this case, there is no transmit power signalling needed for the second wireless device 122 (far UE, UE2), that is, the second wireless device 122 (far UE, UE2) do not need to know whether it is in a MUST or OMA operation. The first wireless device 121 (near UE, UE1) may determine the PDSCH to DMRS power ratio, $$\frac{P_1}{P_{DMRS}},$$

according to Eq. 15-16:
For the first wireless device 121:

$$\frac{P_1}{P_{DMRS}} = \frac{P_1}{P_2} = \frac{\alpha_1}{1-\alpha_1} = \frac{1-\alpha_2}{\alpha_2} \quad \text{(Eq. 15)}$$

For the second wireless device 122:

$$\frac{P_2}{P_{DMRS}} = 1 \quad \text{(Eq. 16)}$$

Figure 27:
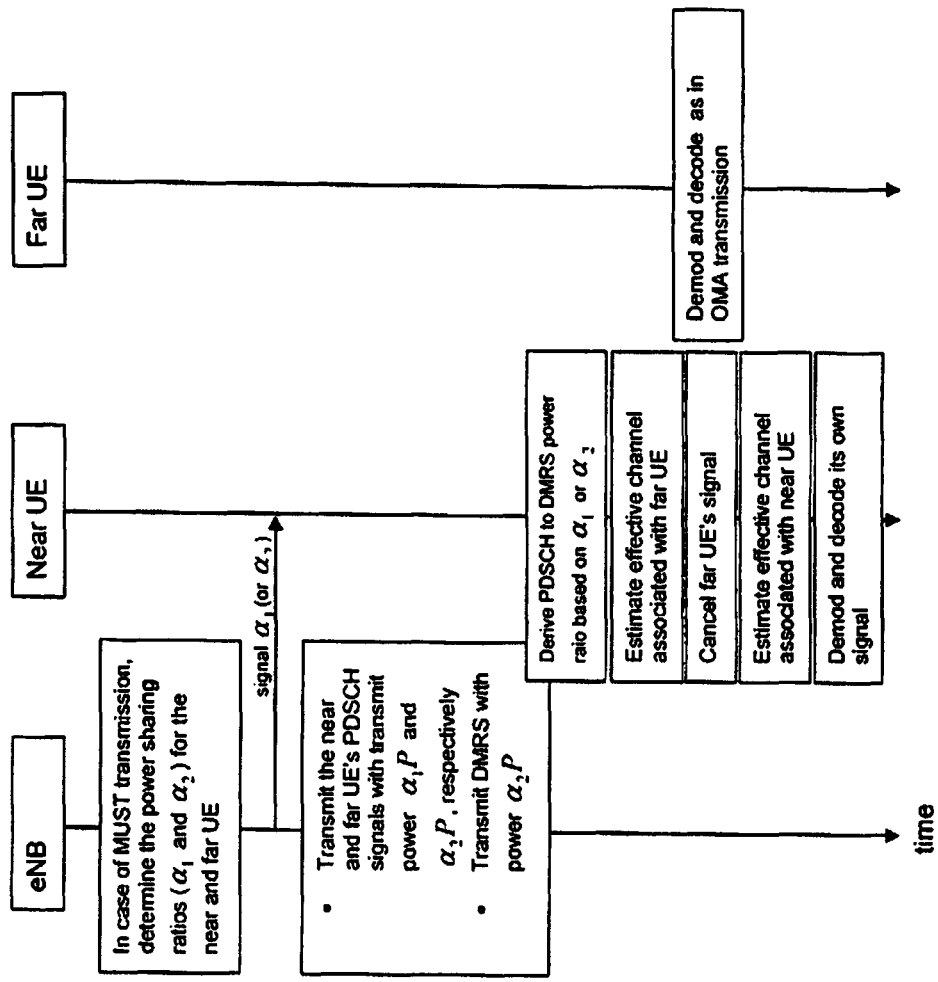
FIG. 27 is a schematic combined flowchart and signalling scheme depicting embodiments of methods in the wireless communications network.

Examples of the embodiment above in this first scenario is shown by the schematic combined flowchart and signalling scheme in FIG. 27. FIG. 27 shows the transmit power signaling for MUST transmission according to this embodiment. For the second wireless device 122 (far UE, UE2), the MUST transmission may be transparent, i.e. the second wireless device 122 (far UE, UE2) may operate in the same way as in regular OMA. Here, there is no transmit power signalling for the second wireless device 122 (far UE, UE2).

In a second scenario, the first wireless device 121 uses a 2-layer transmission. When a 2-layer transmission is used at the first wireless device 121 (near UE, UE1), two DMRS ports (e.g. port 7 and 8) are needed, port 7 for the first layer and port 8 for the second layer. Assuming the second wireless device 122 (far UE, UE2) is paired for MUST transmission and transmits also on layer 1, port 7 should be shared by the first and second wireless device 121, 122. For the first wireless device 121, PDSCH on the 1$^{st}$ layer and the 2$^{nd}$ layer would have transmit power of P$_1$/2; while for the second wireless device 122 (far UE, UE2), the tx power of PDSCH is P$_2$. In this case, the total transmit power needs to be shared between port 7 and port 8.

Figure 28:
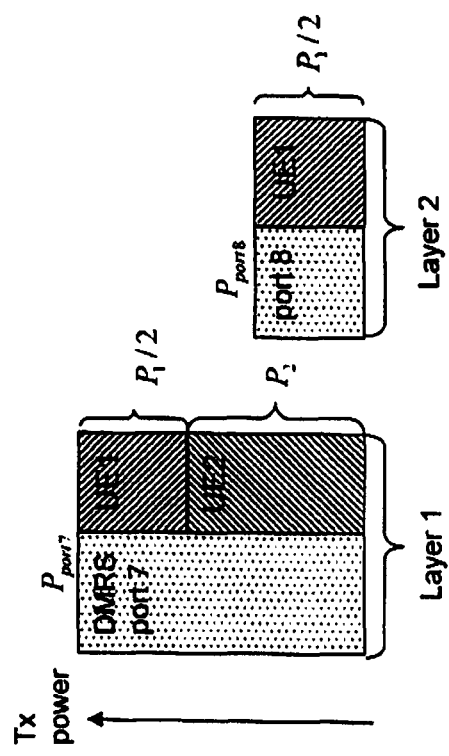
FIG. 28 is a schematic overview depicting transmit powers of two wireless devices and transmit power of DMRS in a MUST transmission according to embodiments of a network node and wireless devices.

For example, in this second scenario and according to some embodiments, wherein P$_1$ and P$_2$ is the transmit powers of the first wireless device 121 and the second wireless device 122, respectively, the DMRS transmit power may be allocated, as shown in FIG. 28, according to:

Port 7 Tx power:

$$P_{port7} = \frac{P_1}{2} + P_2,$$

i.e. the combined transmit power on layer 1.
Port 8 Tx power:

$$P_{port8} = \frac{P_1}{2},$$

i.e. the same as PDSCH transmit power of layer 2.

There two possible options to signal the transmit powers to the first and second wireless device 121, 122 in this case:
Option 1:
With $\alpha_1 = P_1/P$ signalled to the first wireless device 121, the transmit power ratio between the PDSCH of the first layer and DMRS port 7 may be derived by the first wireless device 121 according to Eq. 17:

$$\frac{P_1/2}{P_{port7}} = \frac{\frac{P_1}{2}}{\frac{P_1}{2}+P2} = \frac{P_1}{P_1+2P_2} = \frac{P_1}{P+P_2} = \frac{\alpha_1}{1+\alpha_2} = \frac{\alpha_1}{2-\alpha_1} \quad \text{(Eq. 17)}$$

for the first wireless device 121 layer 1, and according to Eq. 18:

$$\frac{P_1/2}{P_{port7}} = 1 \quad \text{(Eq. 18)}$$

for the first wireless device 121 layer 2.
There is no need to signal the power ratio for the second layer since the PDSCH has the same transmit power as that of DMRS port 8.

For the second wireless device 122, however, it cannot figure out correctly its PDSCH to DMRS power based on $\alpha_2$. This is because, it doesn't know the number of layers scheduled for UE1 and thus may only assume full power transmission of DMRS port 7. So this option does not seem to work.
Option 2:
PDSCH to DMRS power ratio of the first layer is signalled to the first and second wireless device 121, 122, that is, $$\beta_1 = \frac{P_1/2}{P_{port7}}$$

to the first wireless device 121 (near UE, UE1) and $$\beta_2 = \frac{P_2}{P_{port7}}$$

to the second wireless device 122 (far UE, UE2).
However, $\beta_1$ and $\beta_2$ may have different ranges. To use the same signalling for both the first and second wireless device 121, 122, a large range would be needed. In addition, a conversion is required from the scheduled transmit power parameter ($\alpha_1$, $\alpha_2$) to ($\beta_1$, $\beta_2$).

Figure 29:
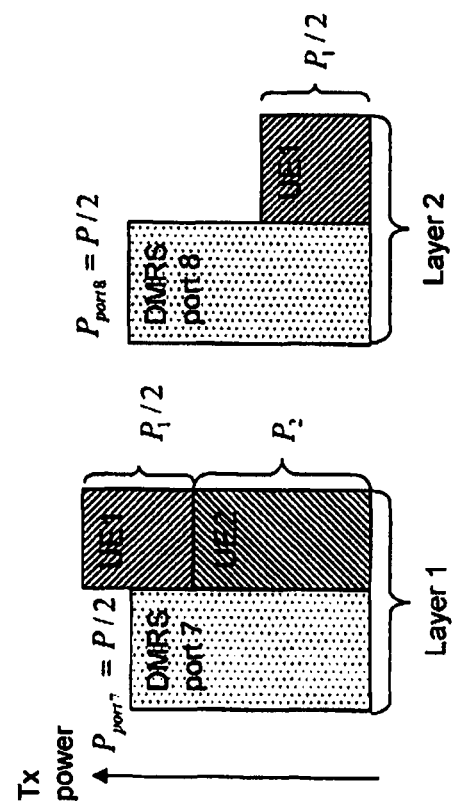
FIG. 29 is a schematic overview depicting transmit powers of two wireless devices and transmit power of DMRS in a MUST transmission according to embodiments of a network node and wireless devices.
Figure 30:
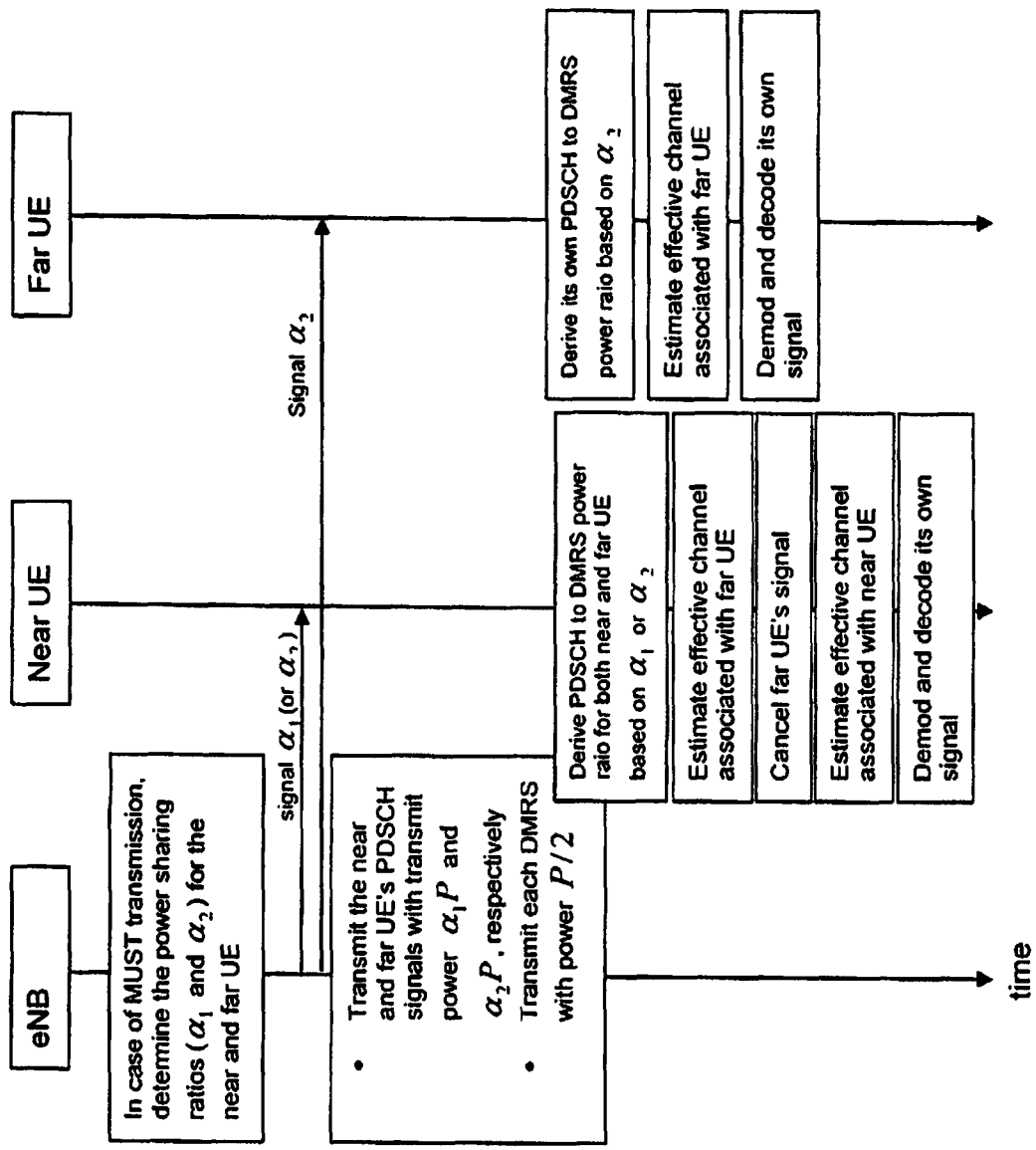
FIG. 30 is a schematic combined flowchart and signalling scheme depicting embodiments of methods in the wireless communications network.

Alternatively, in this second scenario and according to some embodiments, the network node 110 may use an equal transmit power allocation for DMRS ports 7 & 8. This means that the DMRS transmit power may be allocated, as shown in FIG. 29, according to:

Port 7 Tx power:

$$P_{port7} = \frac{P}{2}$$

Port 8 Tx power:

$$P_{port8} = \frac{P}{2}$$

In this case, the first wireless device 121 (near UE, UE1) is signalled with $$\alpha_1 = \frac{P_1}{P}\left(\text{or } \alpha_2 = \frac{P_2}{P}\right)$$

and the second wireless device 122, is signalled with $$\alpha_2 = \frac{P_2}{P}.$$

Thus, the PDSCH to DMRS transmit power ratio may be obtained at the first and second wireless device 121, 122 as follows:

At the first wireless device 121 (near UE, UE1):

$$\frac{P_1/2}{P_{port7}} = \frac{\frac{P_1}{2}}{\frac{P}{2}} = \alpha_1; \quad \text{(layer 1)}$$

$$\frac{P_1/2}{P_{port8}} = \frac{\frac{P_1}{2}}{\frac{P}{2}} = \alpha_1; \quad \text{(layer 2)}$$

and $$\frac{P_2}{P_{port7}} = \frac{P_2}{\frac{P}{2}} = 2\alpha_2 = 2(1-\alpha_1) \quad \text{(for the second wireless device 122)}$$

At the second wireless device 122 (far UE, UE2):

$$\frac{P_2}{P_{port7}} = \frac{P_2}{\frac{P}{2}} = 2\alpha_2. \quad \text{(layer 1)}$$

This embodiment may also support more than 2 layers at the first wireless device 121 (near UE, UE1). Examples of the above embodiments in this second scenario is shown by the schematic combined flowchart and signalling scheme in FIG. 30.

Figure 31:
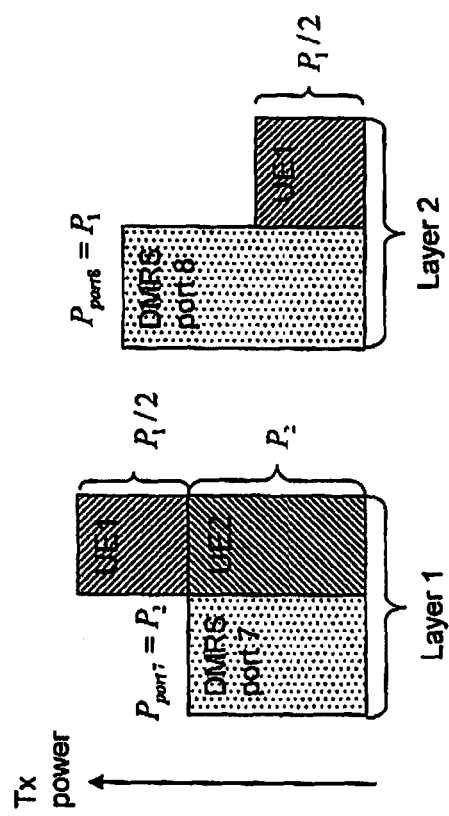
FIG. 31 is a schematic overview depicting transmit powers of two wireless devices and transmit power of DMRS in a MUST transmission according to embodiments of a network node and wireless devices.
Figure 32:
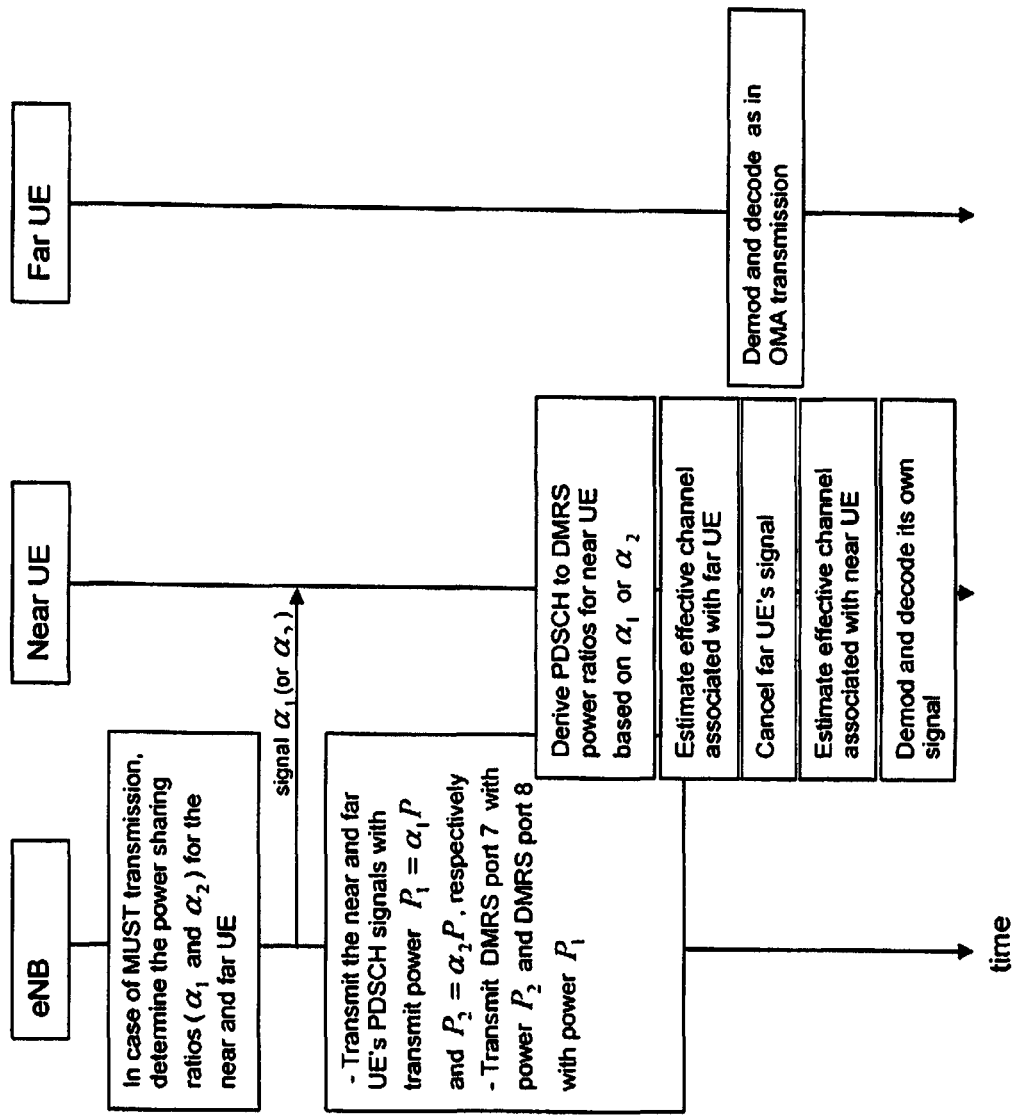
FIG. 32 is a schematic combined flowchart and signalling scheme depicting embodiments of methods in the wireless communications network.

Similar to the first scenario, the transmit power of DMRS port 7 (the layer on which the second wireless device 122 (far UE, UE2) is transmitted) is set to the same as the PDSCH power of the second wireless device 122 (far UE, UE2), and the transmit power of DMRS port 8 is set to the same power of first wireless device 121 (near UE, UE1) as shown in FIG. 31. The network node 110 signals either $\alpha_1$ or $\alpha_2$ ($\alpha_2$ is preferred as explained in solution 2 above) to first wireless device 121 (near UE, UE1). With this power allocation, no additional signalling is needed for the second wireless device 122 (far UE, UE2). For the first wireless device 121 (near UE, UE1), the PDSCH to DMRS transmit power ratio may be calculated as below:

$$\frac{P_1/2}{P_{port7}} = \quad \text{Layer 1 (port 7)}$$

$$\frac{P_1/2}{P_2} = \frac{1}{2}\frac{P_1/(P_1+P_2)}{P_2/(P_1+P_2)} = \frac{1}{2}\frac{\alpha_1}{1-\alpha_1} == \frac{1}{2}\frac{1-\alpha_2}{\alpha_2}$$

$$\frac{P_1/2}{P_{port8}} = \frac{P_1/2}{P_1} = \frac{1}{2} \quad \text{Layer 2 (port 8)}$$

Alternatively, the DMRS power for port 8 can be set by the network node 110 to the PDSCH power of the first wireless device 121 (near UE, UE1) at layer 2. In this case, the first wireless device 121 (near UE, UE1) only needs to calculate the PDSCH to DMRS transmit power ratio for layer 1 (port 7). However, the transmit power of DMRS port 8 would be 3 dB lower, which may degrade the channel estimation performance on layer 2.

Comparing to the first scenario 1, there is a "½" considered during the calculation. As the first wireless device 121 (near UE, UE1) knows what rank it is scheduled, it can make the correct calculation, i.e. whether or not taking the "½" into account during the calculation depending on what rank it is scheduled. Examples of the above embodiments in this second scenario is shown by the schematic combined flowchart and signalling scheme in FIG. 32.

In a third scenario, the first and second wireless device 121, 122 both uses a 2-layer transmission. In this case, again two DMRS ports (e.g. port 7 and 8) are needed, port 7 for the first layer and port 8 for the second layer.

Figure 33:
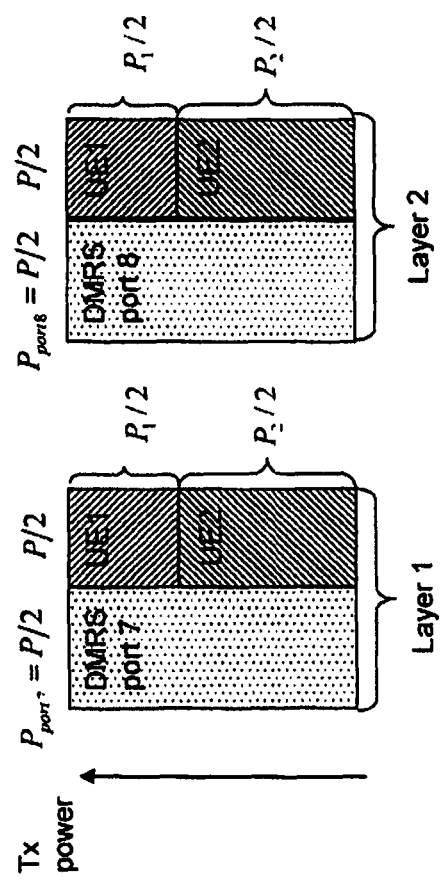
FIG. 33 is a schematic overview depicting transmit powers of two wireless devices and transmit power of DMRS in a MUST transmission according to embodiments of a network node and wireless devices.
Figure 34:
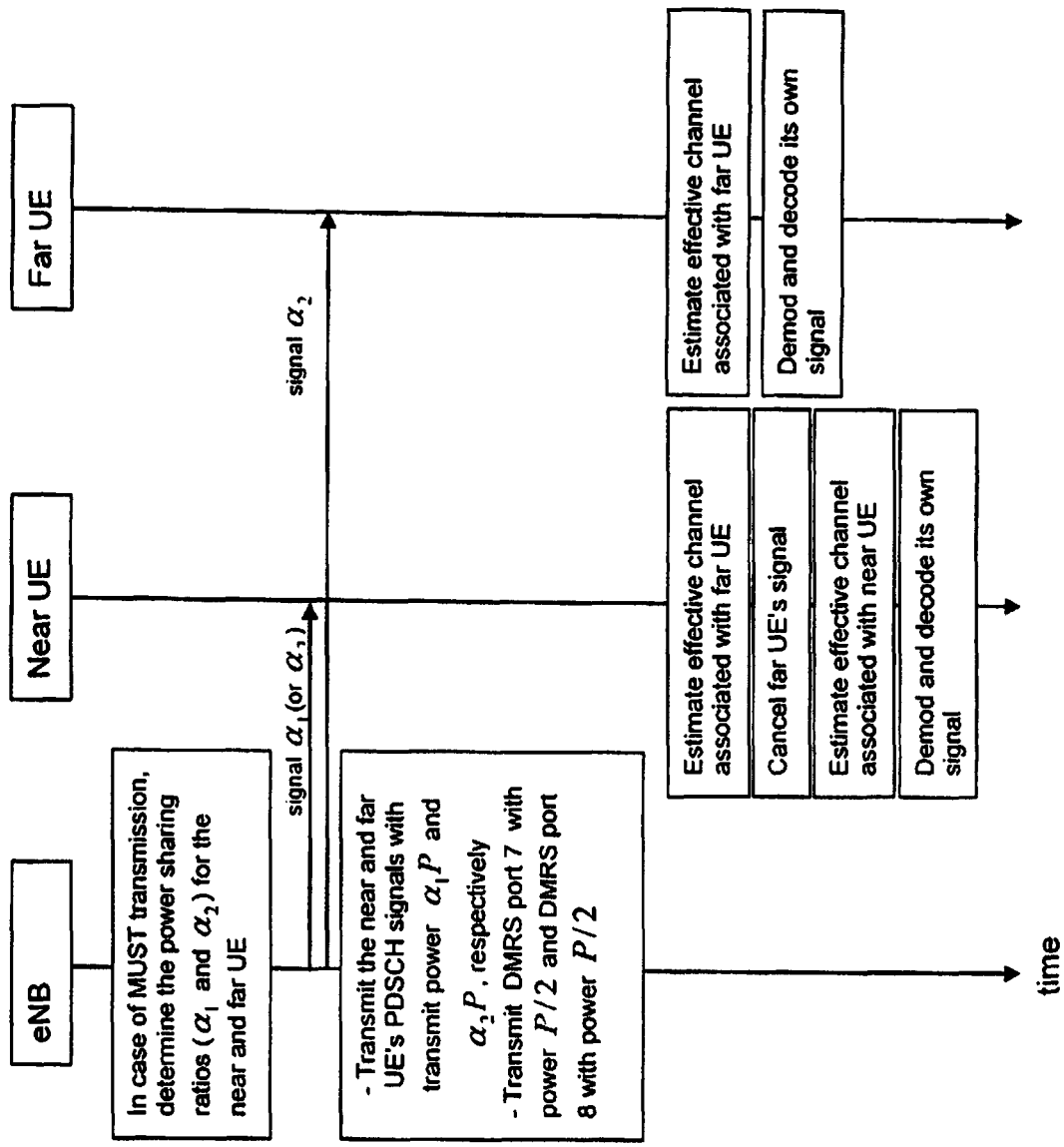
FIG. 34 is a schematic combined flowchart and signalling scheme depicting embodiments of methods in the wireless communications network.

In this third scenario and according to some embodiments, the network node 110 may use an equal transmit power allocation for DMRS ports 7 & 8, as shown in FIG. 33, according to:

$$P_{port7} = \frac{P}{2} \quad \text{Port 7 tx power}$$

$$P_{port8} = \frac{P}{2} \quad \text{Port 8 tx power}$$

The first wireless device 121 (near UE, UE1) is signalled with $$\alpha_1 = \frac{P_1}{P}$$

and the second wireless device 122 (far UE, UE2) is signalled with $$\alpha_2 = \frac{P_2}{P}$$

by the network node 110. Examples of the above embodiments in this third scenario is shown by the schematic combined flowchart and signalling scheme in FIG. 34. It can be shown that the PDSCH to DMRS transmit power ratio is the same for both layers in each of the first and second wireless device 121, 122. It is $\alpha_1$ for the first wireless device 121 (near UE, UE1) and $\alpha_2$ for the second wireless device 122 (far UE, UE2).

Figure 35:
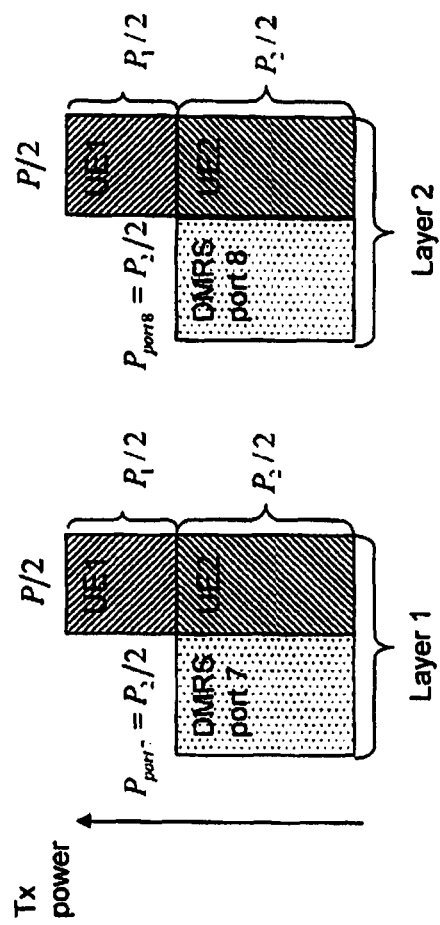
FIG. 35 is a schematic overview depicting transmit powers of two wireless devices and transmit power of DMRS in a MUST transmission according to embodiments of a network node and wireless devices.
Figure 36:
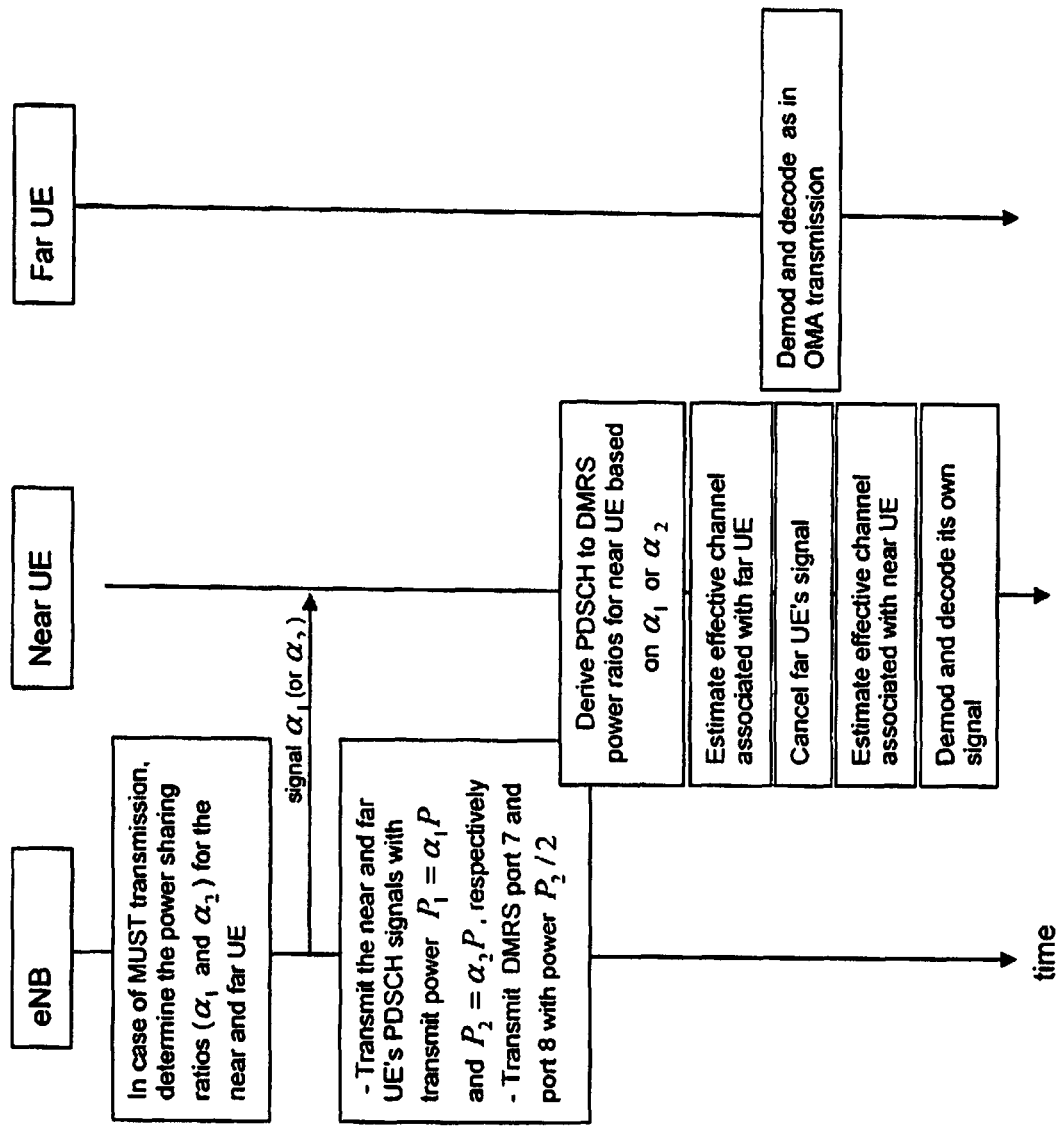
FIG. 36 is a schematic combined flowchart and signalling scheme depicting embodiments of methods in the wireless communications network.

In this third scenario and according to some embodiments, the network node 110 may transmit DMRS on ports 7 and 8 with the same power as the PDSCH power of the second wireless device 122 (far UE, UE2) on each layer as shown in FIG. 35. The network node 110 signals $$\alpha_1 = \frac{P_1}{P} \text{ or } \alpha_2 = \frac{P_2}{P}$$

to only the first wireless device 121 (near UE, UE1). Thus, for the first wireless device 121 (near UE, UE1), the PDSCH to DMRS transmit power ratio may be calculated as below:

$$\frac{P_1/2}{P_{port7}} = \frac{P_1/2}{P_2/2} = \frac{\alpha_1}{1-\alpha_1} = \frac{1-\alpha_2}{\alpha_2} \quad \text{Layer 1}$$

$$\frac{P_1/2}{P_{port8}} = \frac{P_1/2}{P_2/2} = \frac{\alpha_1}{1-\alpha_1} = \frac{1-\alpha_2}{\alpha_2} \quad \text{Layer 2}$$

In this case, PDSCH and DMRS transmit power is the same for the second wireless device 122 (far UE, UE2) and thus no power signalling is needed for the second wireless device 122 (far UE, UE2). Examples of the above embodiments in this third scenario is shown by the schematic combined flowchart and signalling scheme in FIG. 36.

Signalling Transmit Power Ratio $\alpha_1$ or $\alpha_2$

Figure 37:
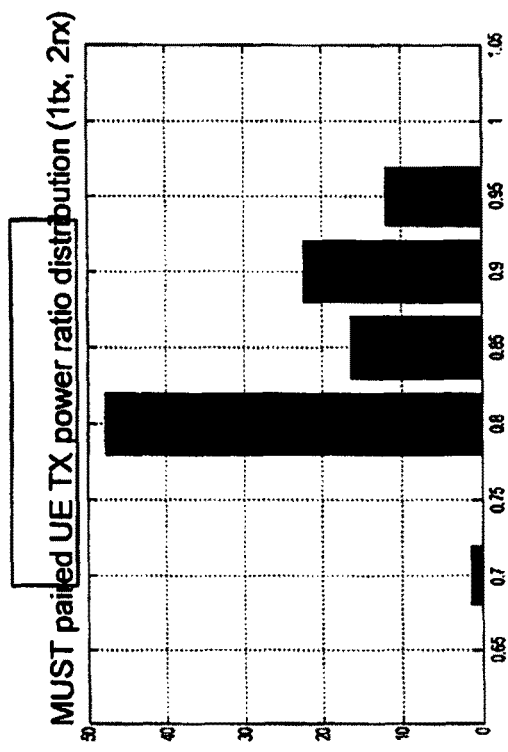
FIG. 37 is a schematic overview depicting an example of a ratio distribution of a MUST transmission according to embodiments of a network node and wireless devices.
Figure 38:
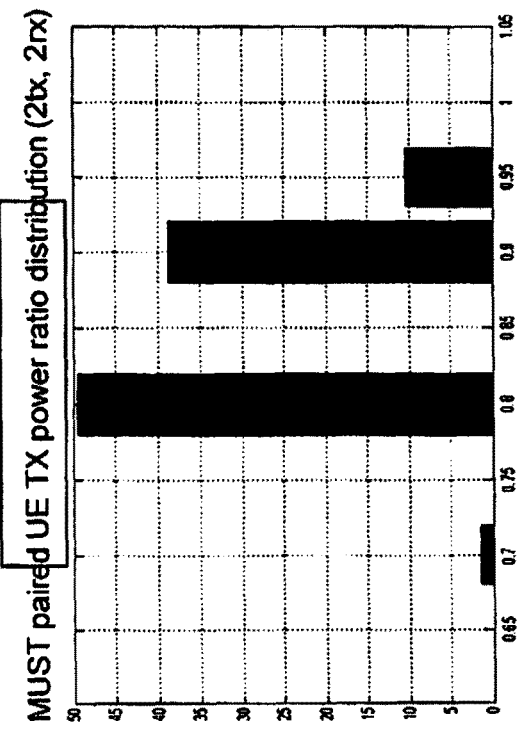
FIG. 38 is a schematic overview depicting another example of a ratio distribution of a MUST transmission according to embodiments of a network node and wireless devices.

The range of $\alpha_2$ determines the number of bits used to signal the parameter. FIG. 37 shows the $\alpha_2$ distribution in a LTE system when one transmit antenna at the network node 110 and two receive antennas are used at the wireless device. FIG. 38 shows the $\alpha_2$ distribution in a LTE system when two transmit antenna at the network node 110 and two receive antennas are used at the wireless device. It can be seen that in both cases, $\alpha_2$ is concentrated between 0.8 to 0.95. Therefore, four values, i.e. {0.8, 0.85, 0.9, 0.95}, may be used for $\alpha_2$. In this case, 2 bits can be used to signal $\alpha_2$. Alternatively, {0.8, 0.9} may be used, and then, one bit is enough to signal $\alpha_2$.

Alternatively, in some embodiments, a wireless device is signaled $\alpha_2$ with the full range, e.g. {0.9, 0.8, 0.7, 0.6, 0.4, 0.3, 0.2, 0.1}. The wireless device shall assume MUST reception paired with a second wireless device 122 (far UE, UE2) whenever the signalled $\alpha_2$<0.5, and assume MUST reception paired with a first wireless device 121 (near UE, UE1) whenever $\alpha_2$>0.5.

Alternatively, in some embodiments, it is observed that MUST operation is most effective when $\alpha$ is closed to the edges of the range 0<$\alpha$<1. Hence, the specified possible values is unequally sampled with closer spacing near the edges. For example, {0.95, 0.9, 0.8, 0.6, 0.4, 0.2, 0.1, 0.05}. {0.95, 0.9, 0.8, 0.6, 0.4, 0.2, 0.1, 0.05}.

In some embodiments, DCI format 1D is used for MUST enabled wireless devices and to signal $\alpha_1$ (or $\alpha_2$) to the wireless devices. The power control bit in DCI 1D may be re-interpreted as a toggle between two possible values of $\alpha_1$ (or $\alpha_2$). Additionally, one of the $\alpha_1$ (or $\alpha_2$) values may implicitly indicate whether the wireless device shall perform MUST reception or OMA reception when receiving PDSCH.

In some embodiments, the power sharing parameter $\alpha_2$ (or $\alpha_1$) may be signaled to a wireless device dynamically in a DCI, i.e. whenever the wireless device is scheduled in a MUST transmission with another wireless device. The signaling can be explicit, i.e. a number of bits are used to indicate the power ratio, or implicit, i.e. the power ratio may be linked to some other scheduling parameters such as modulation level such as QPSK, 16QAM, or 64QAM. For example, for a given pair of first and second wireless device 121,122 modulation levels, i.e. QPSK in the first wireless device 121 (near UE, UE1) with QPSK in the second wireless device 122 (far UE, UE2), 16QAM in the first wireless device 121 (near UE, UE1) with QPSK in the second wireless device 122 (far UE, UE2), etc.), a predefined power ratio can be assumed.

In some embodiments, the power sharing parameter $\alpha_2$ (or $\alpha_1$) may be signalled semi-statically through RRC signalling.

Indicating Interfering Power and Modulation in a Co-Modulator

It may be desirable to jointly modulate, or 'co-modulate' the first and second wireless device 121 in order to improve their joint distance properties. Due to the properties of LTE modulators, it is possible to use a higher order modulator as the basis for a co-modulator of the first wireless device 121 (near UE, UE1) and the second wireless device 122 (far UE, UE2).

Figure 39:
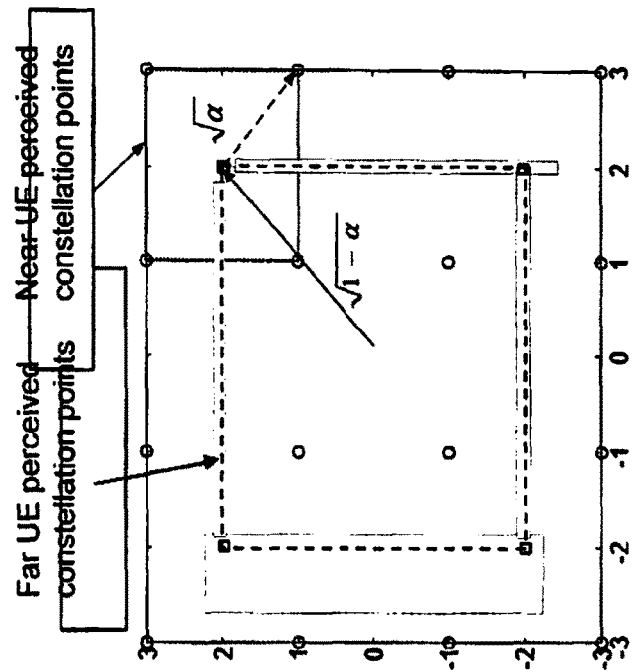
FIG. 39 is a schematic overview depicting an example of QPSK constellations according to embodiments of a network node and wireless devices.

FIG. 39 shows where subsets with a 16 QAM co-modulated constellation are used to form QPSK constellations for both the first wireless device 121 (near UE, UE1) and the second wireless device 122 (far UE, UE2). Each point in the constellation can be uniquely identified with 4 bits, and two bits from each of the first wireless device 121 (near UE, UE1) and the second wireless device 122 (far UE, UE2) jointly select a modulation point. The selection is such that the second wireless device 122 (far UE, UE2) bits select groups of points that are relatively far apart, while the first wireless device 121 (near UE, UE1) bits select constellation points that are more close together. This is illustrated in FIG. 39, where the possible first wireless device 121 (near UE, UE1) constellation points when the second wireless device 122 (far UE, UE2) selects constellation points in the upper right. Note that while only points in the 16 QAM constellation are transmitted, because the first wireless device 121 (near UE, UE1) bits select clusters of constellation points, the second wireless device 122 (far UE, UE2) perceives a QPSK constellation (marked with blue squares) at the centroids of first wireless device 121 (near UE, UE1) clusters.

The first wireless device 121 (near UE, UE1) constellations and perceived second wireless device 122 (far UE, UE2) constellations can be thought of as splitting the power transmitted by the network node 110. The power fraction for the first wireless device 121 (near UE, UE1) is denoted as $\alpha=\alpha_1$ in FIG. 39, while the second wireless device 122 (far UE, UE2) has 1-$\alpha$. In FIG. 39, $\alpha=0.2$ To allow more than one value of $\alpha$, it is necessary to modify the LTE 16 QAM modulator. Such a modulator can be constructed as follows. Let b(i) and b(i+1) in Table 2 be two bits to be modulated in a given modulation symbol for the second wireless device 122 (far UE, UE2). Note that the constellation bits used for the second wireless device 122 (far UE, UE2) are the two lowest contiguous bits of the modulator. This is needed in order for the first and second wireless device 121,122 to have QPSK constellations. Similarly, let bits b(i+2) and b(i+3) be two bits to be modulated in a given modulation symbol for the first wireless device 121 (near UE, UE1). Also, let 'a' in Table 2 be a real number. Note that this modulator may be followed by a multiplier that normalizes the average modulator output power to one for a given value of 'a'.

TABLE 2

| b(i), b(i + 1), b(i + 2), b(i + 3) | I | Q |
|---|---|---|
| 0000 | 1 + a | 1 + a |
| 0001 | 1 + a | 3 + a |
| 0010 | 3 + a | 1 + a |
| 0011 | 3 + a | 3 + a |
| 0100 | 1 + a | −1 − a |
| 0101 | 1 + a | −3 − a |
| 0110 | 3 + a | −1 − a |
| 0111 | 3 + a | −3 − a |
| 1000 | −1 − a | 1 + a |
| 1001 | −1 − a | 3 + a |
| 1010 | −3 − a | 1 + a |
| 1011 | −3 − a | 3 + a |
| 1100 | −1 − a | −1 − a |
| 1101 | −1 − a | −3 − a |
| 1110 | −3 − a | −1 − a |
| 1111 | −3 − a | −3 − a |

Varying 'a' allows the power in the first and second wireless device 121, 122 transmissions, and hence α, to be set to a wide variety of values. If a=0, then α=0.2 as in FIG. 39 above.

Figure 40:
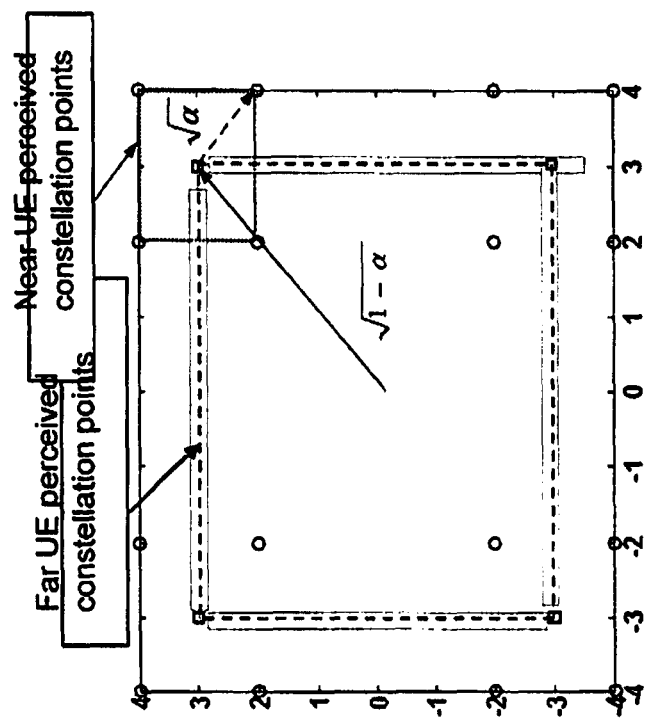
FIG. 40 is a schematic overview depicting another example of QPSK constellations according to embodiments of a network node and wireless devices.

However, if a=1, then the combined constellation is as shown in FIG. 40 below. Here, there is more power allocated to the second wireless device 122 (far UE, UE2) and α=0.1. FIG. 40 shows a first wireless device 121 (near UE, UE1) QPSK constellations and second wireless device 122 (far UE, UE2) QPSK constellations from 16QAM scalable co-modulation with a=1.

Figure 41:
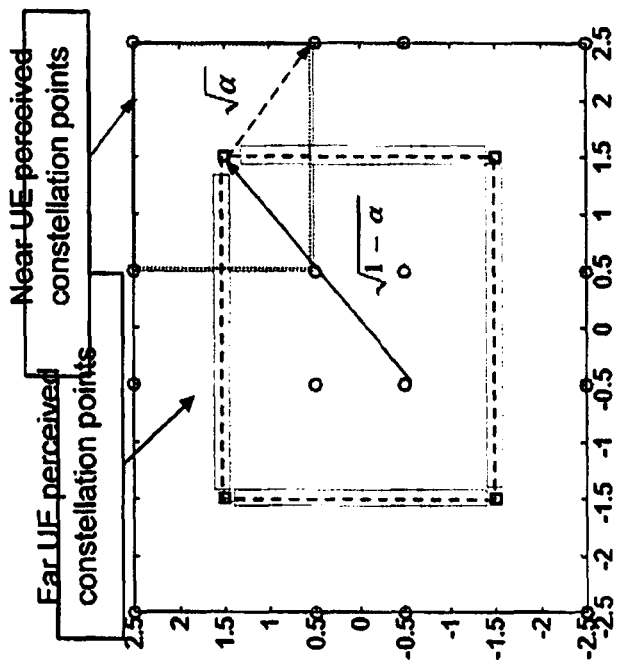
FIG. 41 is a schematic overview depicting a further example of QPSK constellations according to embodiments of a network node and wireless devices.

It is also possible to transmit more power to the first wireless device 121 (near UE, UE1). If a=−0.5, then the combined constellation is as shown in FIG. 41 below. Here, there is more power allocated to the second wireless device 122 (far UE, UE2), and α=0.3077. FIG. 41 shows a first wireless device 121 (near UE, UE1) QPSK constellations and second wireless device 122 (far UE, UE2) QPSK constellations from 16QAM scalable co-modulation with a=0.5 and a=−0.5.

In order for the first wireless device 121 (near UE, UE1) to receive a transmission using the scalable co-modulator, it needs to know what co-modulation was used. The co-modulation can be identified by its order (in the example, the modulation order is 4 bits), the number of bits intended for the first wireless device 121 (near UE, UE1), and the power scaling constant a. It may be desirable to limit the number of different values of a that can be used in the co-modulation, such as a={−0.5, 0, 1} or another set of values. It is also possible that a single value of a may be used, such as a=0, that is known to the wireless device by specification or by default. Therefore, the first wireless device 121 (near UE, UE1) should at least be signaled information indicating the modulation order used to co-modulate the first and second wireless device 122 bits and the number of bits intended for the first wireless device 121 (near UE, UE1) in each modulation symbol. When the co-modulator can use more than one value of a, the wireless device should also be signaled information indicating what value of a is used.

If MUST is designed such that it can be assumed that the first wireless device 121 (near UE, UE1) use symbol level interference cancellation, it is sufficient for the first wireless device 121 (near UE, UE1) to be able to determine the modulation and relative power of the co-scheduled second wireless device 122 (far UE, UE2). That is, it is not necessary for the first wireless device 121 (near UE, UE1) to know the information to decode the second wireless device 122 (far UE, UE2), as would be the case if it were assumed that first wireless device 121 (near UE, UE1) use code word interference cancellation (CWIC). Information needed for CWIC includes the code rate, transport block size, and redundancy version of the second wireless device 122 (far UE, UE2). When symbol level interference cancellation is used, the second wireless device 122 (far UE, UE2) bits can be treated as random, having equal probability of being 0 or 1, by the first wireless device 121 (near UE, UE1). Therefore, in an embodiment, a UE may assume that some bits that are modulated together with the UE's bits are random with equal probability of being '0' or '1'. In the 16 QAM scalable co-modulator example embodiment, the wireless device can assume that bits b(i) and b(i+1) are both random with equal probability of being '0' or '1'.

Embodiments using other modulation orders than 16QAM operate in the same manner, that is, bits for the second wireless device 122 (far UE, UE2) may be concatenated with bits for the first wireless device 121 (near UE, UE1), and the concatenated bits are modulated together to produce one modulation symbol. The modulator is configured with a real valued constant that sets the ratio of the first wireless device 121 (near UE, UE1) to second wireless device 122 (far UE, UE2) power and/or the ratios of the first or second wireless device 121,122 power to the total power in the co-modulated symbol.

The transmitted power for a subset of co-modulated bits may be expressed as the average power produced when the subset of the co-modulated bits varies, while the other co-modulated bits are held fixed at each of their possible values. For example, the average power for the first wireless device 121 (near UE, UE1), $p_{near}^{ave}$, with the 16 QAM modulation can be expressed as:

$$\mu(b_0, b_1) = \frac{1}{4} \sum_{b_2=(0,1), b_3=(0,1)} m(b_0, b_1, b_2, b_3)$$

$$P_{near}(b_0, b_1) = \frac{1}{4} \sum_{b_2=(0,1), b_3=(0,1)} |m(b_0, b_1, b_2, b_3) - \mu(b_0, b_1)|^2$$

$$P_{near}^{ave} = \frac{1}{4} \sum_{b_0=(0,1), b_1=(0,1)} P_{near}(b_0, b_1)$$

where the (complex valued) co-modulator output for bits b(i), b(i+1), b(i+2), and b(i+3) respectively is indicated with $m(b_0,b_1,b_2,b_3)$. Bits b(i) and b(i+1) corresponding to $b_0$ and $b_1$ are intended for the second wireless device 122 (far UE, UE2), and bits b(i+2) and b(i+3) corresponding to $b_2$ and $b_3$ are intended for the first wireless device 121 (near UE, UE1). The bits of the second wireless device 122 (far UE, UE2) may correspond to contiguous low order bits of the modulator. Furthermore, the modulator output power may be scaled by a constant determined from the real valued constant, producing an average modulator output power of 1.

Indicating Power Ratios for REMA

The REMA scheme described in the background has power ratios that are predefined and are dependent on the modulation scheme used in the first and second wireless device 121, 122. Hence, this can be exploited to simplify the signaling of the respective power ratio to the first and second wireless device 121, 122. Since the first wireless device 121 (near UE, UE1) will already receive its modulation scheme via dynamic signalling from the network node 110, an additional 2 bits $\{b_0,b_1\}$ can be used to indicate the associated power ratio. For instance, from Table 1, when the first wireless device 121 (near UE, UE1) is scheduled with QPSK constellation in MUST, the first wireless device 121 (near UE, UE1) power share can have three different values (i.e., −6.9867 dB, −13.1876 dB, or −19.2082 dB). Hence, the two bits 2 bits $\{b_0,b_1\}$ can be used to signal to the first wireless device 121 (near UE, UE1), the power ratio $\alpha_1$ to be used for receiving the MUST transmission. From the fixed modulation scheme to power share ratio mappings in Table 1, the two bits can also be used by the first wireless device 121 (near UE, UE1) to determine modulation scheme of the second wireless device 122 (far UE, UE2). If the first wireless device 121 (near UE, UE1) is scheduled in MUST with a QPSK constellation:

$\{b0,b1\}=\{00\}$ could be used to indicate a power share of −6.9867 dB $\{b0,b1\}=\{01\}$ could be used to indicate a power share of −13.1876 dB $\{b0,b1\}=\{10\}$ could be used to indicate a power share of −19.2082 dB.

A similar two bit signalling approach can also be to signal the power share ratios for the second wireless device 122 (far UE, UE2). However, the two bits $\{b0,b1\}$ should be mapped to the power share ratios corresponding to the second wireless device 122 (far UE, UE2). If the second wireless device 122 (far UE, UE2) is scheduled in MUST with a QPSK constellation:

$\{b0,b1\}=\{00\}$ could be used to indicate a power share of −0.9691 dB $\{b0,b1\}=\{01\}$ could be used to indicate a power share of −1.1805 dB $\{b0,b1\}=\{00\}$ could be used to indicate a power share of −1.2321 dB.

The presence or absence of additional MUST reception parameters (that are required by the first wireless device 121 (near UE, UE1)) can be used to differentiate the first wireless device 121 (near UE, UE1) from the second wireless device 122 (far UE, UE2). If such additional MUST reception parameters are present, then the wireless device is a first wireless device 121 (near UE, UE1) and the bits $\{b0,b1\}$ should be mapped to the first wireless device 121 (near UE, UE1) power share values. If such additional MUST reception parameters are absent, then the wireless device is a second wireless device 122 (far UE, UE2) and the bits $\{b0,b1\}$ should be mapped to the second wireless device 122 (far UE, UE2) power share values. The mapping of $\{b0,b1\}$ to power share values of the first wireless device 121 (near UE, UE1) and the second wireless device 122 (far UE, UE2) can be similarly defined for 16-QAM and 64-QAM cases.

According to some further aspects of the embodiments described above, it follows that a method performed by a network node 110 for performing a superposed transmission in a wireless communications network 100 is provided. The method may comprise: transmitting information indicating a number of bits in a first bit group intended for a first wireless device 121 and a modulation order; concatenating the first bit group intended for the first wireless device 121 and a second bit group to form a concatenated bit group; modulating the concatenated bit group in the modulator, the modulator producing one modulation symbol having the modulation order and corresponding to the concatenated bit group; transmitting the modulated symbol, wherein the average power of the transmitted modulation symbol when the first bit group varies is a first power, the average power of the transmitted modulation symbol when the concatenated bit group varies is a second power, and the ratio of the first power to the second power is set at least in part by the number of bits in the first bit group. In some embodiments of this method, the method may further comprise configuring the modulator with a parameter, wherein the ratio of the first power to the second power is set by the parameter; and transmitting information indicating the parameter. In some embodiments of this method, the method may further comprise transmitting information indicating one or more of the first power, the second power, and the ratio of the first power to the second power, to at least the first wireless device 121 in the wireless communications network 100. In some embodiments of this method, the second bit group may correspond to the low order bits of the modulator. In some embodiments of this method, the method may further comprise the first wireless device 121 may assume that one or more of the bits in the concatenated bit group are random with equal probability of being '0' or '1'. In some embodiments of this method, the modulated symbol may be scaled by a value determined from the parameter.

Furthermore, according to some aspects of the embodiments described above, it follows that a method performed by a first wireless device 121 for handling a superposed transmission from a network node 110 in a wireless communications network 100 is provided. The method may comprise: receiving information indicating a number of bits in a first bit group intended for a first wireless device 121 and a modulation order; receiving a modulated symbol having the modulation order; demodulating the modulated symbol, thereby determining a concatenated bit group that comprises a first bit group, wherein the average power of modulation symbols produced by a modulator having the modulation order when the first bit group varies is a first power, the average power of modulation symbols produced by the modulator having the modulation order when the concatenated bit group varies is a second power, and the ratio of the first power to the second power is set at least in part by the number of bits in the first bit group. In some embodiments of this method, the method may further comprise receiving information indicating a parameter that configures a modulator that modulates the concatenated bit group, wherein the ratio of the first power to the second power is set by the parameter. In some embodiments of this method, the method may further comprise receiving information indicating one or more of the first power, the second power, and the ratio of the first power to the second power. In some embodiments of this method, the second bit group may correspond to the low order bits of the modulator. In some embodiments of this method, the method may further comprise the first wireless device 121 may assume that one or more of the bits in the concatenated bit group are random with equal probability of being '0' or '1'. In some embodiments of this method, the modulated symbol may be scaled by a value determined from the parameter.

According to some further aspects of the embodiments herein, several embodiments to signal UE transmit power allocation for MUST transmissions are presented.

According to a first aspect, in CRS based MUST transmissions, several embodiments are proposed to signal the transmit power ratio between a PDSCH of a wireless device and CRS in a MUST transmission.

For example, in some embodiments, the network node 110 may signal to the second wireless device 122 the PDSCH to CRS transmit power ratio ($\rho_2$) of the second wireless device 122 in a MUST transmission, and signal to the first wireless device 121 both the PDSCH to CRS transmit power ratio ($\rho_2$) of the second wireless device 122 and the PDSCH to CRS transmit power ratio ($\rho_1$) of the first wireless device 121.

For example, in some embodiments, the network node 110 may configure the same PDSCH transmit power for all wireless devices in OMA transmission, and configure the total transmit power of MUST transmission the same as in OMA transmission. In this case, the network node 110 may signal to each of the first and second wireless device 121, 122, the ratio ($\alpha_1$) of its PDSCH transmit power to the total transmit power in MUST transmission.

For example, in some embodiments, the network node 110 may signal to the first wireless device 121, the product, $$\alpha_1 \cdot \frac{P}{P_{OMA}^{UE1}},$$

of the ratio ($\alpha_1$) between its PDSCH transmit power ($P_1$) and the total PDSCH transmit power (P) of the first and second wireless device 121, 122, and the ratio between P and its OMA PDSCH transmit power ($P_{OMA}^{UE1}$). Here, similarly, the network node 110 may signal to the second wireless device 122, the product, $$\alpha_2 \cdot \frac{P}{P_{OMA}^{UE2}},$$

where $P_{OMA}^{UE2}$ is the OMA PDSCH transmit power of the second wireless device 122.

For example, in some embodiments, the network node 110 may signal a common cell specific parameter to indicate the total transmit power for MUST transmission. In addition, the network node 110 may signal the ratio between the PDSCH transmit power of each of the first and second wireless device 121, 122 and the total PDSCH transmit power of the first and second wireless device 121, 122.

For example, in some embodiments, the network node 110 may schedule only single layer QPSK modulation for the second wireless device 122. Here, no transmit power signalling to the second wireless device 122 is performed, since MUST transmission is transparent to the second wireless device 122. The network node 110 may here signal only to the first wireless device 121 about the transmit power of both the first and second wireless device 121, 122 as discussed above.

According to a second aspect, in DMRS based MUST transmissions, several embodiments are proposed for power allocation for one or multiple DMRS ports.

For example, in some embodiments, the network node 110 may, for single layer transmission in both the first and second wireless device 121,122 and with the same DMRS port, transmit the DMRS with the total power P. Also, the network node 110 may here signal $\alpha_1$ (or $\alpha_2$) to the first wireless device 121 and $\alpha_2$ to the second wireless device 122.

For example, in some embodiments, the network node 110 may, for single layer transmission in both the first and second wireless device 121,122 and with the same DMRS port, transmit the DMRS with the same power as the second wireless device 122, i.e. $P_2$. Also, the network node 110 may here signal $\alpha_1$ (or $\alpha_2$) to the first wireless device 121. No signaling to the second wireless device 122 is performed, since MUST transmission is transparent to the second wireless device 122.

For example, in some embodiments, the network node 110 may, when the first wireless device 121 is scheduled with two layers while the second wireless device 122 is scheduled with one layer, transmit the DMRS associated with each layer with the total PDSCH power on the same layer, i.e. one with $P_1/2+P_2$ and the other with $P_1/2$. Also, the network node 110 may here signal $\alpha_1$ (or $\alpha_2$) to the first wireless device 121 and $\alpha_2$ to the second wireless device 122.

For example, in some embodiments, the network node 110 may, when the first wireless device 121 is scheduled with two layers while the second wireless device 122 is scheduled with one layer, transmit the DMRS associated with each layer with half of the total PDSCH power on both layers, i.e. P/2. Also, the network node 110 may here signal $\alpha_1$ (or $\alpha_2$) to the first wireless device 121 and $\alpha_2$ to the second wireless device 122.

For example, in some embodiments, the network node 110 may, when the first wireless device 121 is scheduled with two layers while the second wireless device 122 is scheduled with one layer, transmit the DMRS associated with the second wireless device 122 is transmitted with the same power as the PDSCH of the second wireless device 122, i.e. $P_2$. Also, the network node 110 may here transmit the other DMRS with the remaining power, i.e. $P-P_2=P_1$. Further, the network node 110 may signal $\alpha_1$ (or $\alpha_2$) to the first wireless device 121. Here, no signalling to the second wireless device 122 is performed, i.e. the second wireless device 122 is unaware of the MUST transmission.

For example, in some embodiments, the network node 110 may, when the first and second wireless device 121, 122 are both scheduled with two layers, transmit each DMRS with half of the total power, i.e. P/2. Also, the network node 110 may here signal $\alpha_1$ (or $\alpha_2$) to the first wireless device 121 and $\alpha_2$ to the second wireless device 122.

For example, in some embodiments, the network node 110 may, when the first and second wireless device 121, 122 are both scheduled with two layers, transmit each DMRS with the same power as the PDSCH power of the second wireless device 122 on the same layer, i.e. $P_2/2$. Also, the network node 110 may here signal $\alpha_1$ (or $\alpha_2$) to the first wireless device 121. Here, no signalling to the second wireless device 122 is performed, i.e. the second wireless device 122 is unaware of the MUST transmission.

According to yet some further aspects of the embodiments herein, several embodiments to signal $\alpha_1$ (or $\alpha_2$) to a wireless device are also presented herein.

For example, in some embodiments, the network node 110 may signal only $\alpha_2$ to the first and second wireless device 121, 122. In some embodiments, the network node 110 may signal a full range parameter between 0 and 1, wherein the first wireless device 121 is indicated by a value less than 0.5 and a second wireless device 122 is indicated by a value greater than 0.5. Optionally, in some embodiments, the range of $\alpha_2$ may be equally spaced or non-uniformly spaced between 0.5 and 1, whereby a number of bits may be used by the network node 110 to signal one of the values. In some embodiments, the network node 110 may perform the signalling dynamically or semi-statically. For dynamic signalling, the network node 110 may reuse DCI 1D or a modified version thereof.

Figure 43:
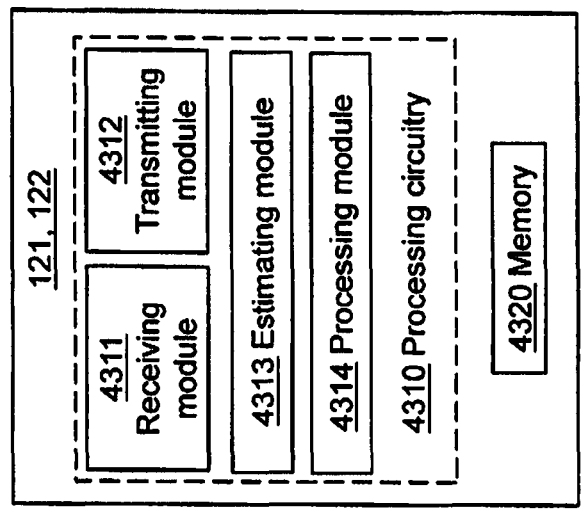
FIG. 43 is a block diagram depicting embodiments of the first and second wireless device.
Figure 42:
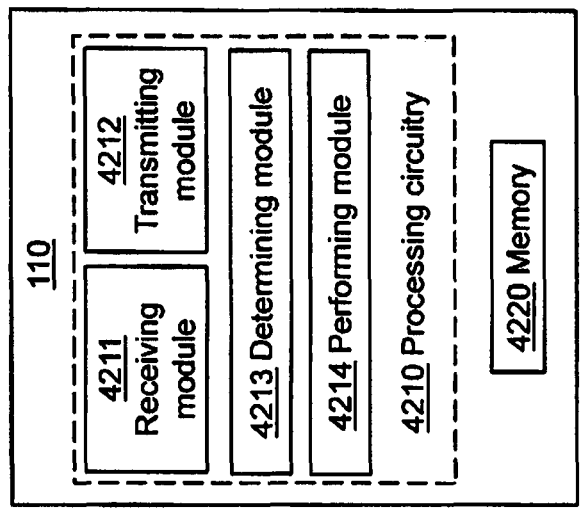
FIG. 42 is a block diagram depicting embodiments of a network node.

To perform the method actions herein a network node 110 and a wireless device 121, 122 are provided. FIGS. 42-43 are a block diagrams depicting the network node 110 and the wireless device 121, 122. The network node 110 is configured to perform the method described for the network node 110 in the above embodiments herein, while the wireless device 121, 122 is configured to perform the method described for the first wireless device 121 and/or the second wireless device 122 in the above embodiments herein.

For the network node 110, the embodiments herein for performing a superposed transmission in a wireless communications network 100 may be implemented through one or more processors 4210 in the network node 110 depicted in FIG. 42, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a receiving module 4211 and a transmitting module 4212 over which the network node 110 may transmit and receive signals to or from other nodes in the wireless communications network 100, such as, e.g. the first and second wireless device 121, 122 or other network nodes (not shown). Also, the network node 110 may comprise a determining module 4213 for determining a first ratio and a second ratio for the superposed transmission according to the embodiments described herein, and a performing module 4214 for performing the superposed transmission to the first and second wireless device 121, 122 according to the embodiments described herein. The network node 110 further comprises a memory 4220. The memory 4220 may, for example, be used to store applications or programs to perform the methods herein and/or any information used by such applications or programs. The network node 110 may further comprise an input/output interface (not shown), which may be used to communicate over a wired connection with other radio network entities or nodes in the wireless communications network 100.

For the wireless device 121, 122, the embodiments herein for handling a superposed transmission in a wireless communications network 100 may be implemented through one or more processors 4310 in the wireless device 121, 122 depicted in FIG. 43, together with computer program code for performing the functions and/or method actions of the embodiments herein. The program code mentioned above may also be provided as a computer program product, for instance in the form of a data carrier carrying computer program code for performing embodiments herein when being loaded into the wireless device 121, 122. One such carrier may be in the form of a CD ROM disc. It is however feasible with other data carriers such as a memory stick. The computer program code may furthermore be provided as pure program code on a server and downloaded to the wireless device 121, 122.

The wireless device 121 comprises a receiving module 4311 and a transmitting module 4312 over which the wireless device 121 may transmit and receive signals to or from other nodes in the wireless communications network 100, such as, e.g. the network node 110 or other network nodes (not shown). Also, the wireless device 121 may comprise estimating module 4313 for estimates channels according to the embodiments described herein, and a processing module 4314 for processing signals using estimated channels according to the embodiments described herein. The wireless device 121 further comprises a memory 4320. The memory 4320 may, for example, be used to store applications or programs to perform the methods herein and/or any information used by such applications or programs.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 4210, 4310, cause the at least one processor to carry out the method for performing or handling a superposed transmission in a wireless communications network 100. Also, some embodiments may, as described above, further comprise a carrier containing said computer program, wherein the carrier is one of an electronic signal, optical signal, radio signal, or computer readable storage medium.

According to some aspects of embodiments herein, a method performed by a network node for performing a superposed transmission in a wireless communications network is provided. The superposed transmission comprises a first signal intended for a first wireless device from the network node and a second signal intended for a second wireless device from the network node that are superposed and transmitted simultaneously by the network node on the same transmission resources in the wireless communications network. Here, the network node determines a first ratio of the total transmission power available for the superposed transmission, which first ratio is to be used for the first signal in the superposed transmission. Also, the network node determines a second ratio of the total transmission power available for the superposed transmission, which second ratio is to be used for the second signal in the superposed transmission. Then, the network node transmits information indicating the first and/or second ratio to at least the first wireless device in the wireless communications network. Further, the network node performs the superposed transmission to the first and second wireless device simultaneously on the same transmission resources by transmitting the first signal using a transmission power according to the first ratio and by transmitting the second signal using a transmission power according to the second ratio. In some embodiments, the transmission resources may be the same time-, frequency-, and/or spatial transmission resources in the wireless communications network. In some embodiments, the first wireless device is located at a first distance from the network node and the second wireless device is located at a second distance from the network node, wherein the first distance is smaller than the second distance. In some embodiments, the network node may further transmit information indicating the second ratio to the second wireless device. In some embodiments, the network node may transmit the information indicating the first and/or second ratio only to the first wireless device. In some embodiments, the information indicating the first and/or second ratio is signaled dynamically through a Physical Downlink Control Channel, PDCCH, or an Enhanced Physical Downlink Control Channel, EPDCCH. In some embodiments, the information indicating the first and/or second ratio is signaled semi-statically through Radio Resource Control, RRC, messages. In some embodiments, the information indicating the first and/or second ratio is signaled explicitly using a number of predetermined bits, wherein each predetermined bit indicates a particular ratio. In some embodiments, the first ratio is uniformly quantized within the range between 0 and 0.5, and the second ratio is uniformly quantized with the range between 0.5 and 1. In some embodiments, the first ratio is non-uniformly quantized within the range between 0 and 0.5 and the second ratio is non-uniformly quantized with the range between 0.5 and 1. In some embodiments, when the network node is configured to perform the superposed transmission using a transmission mode comprising Cell-specific Reference Signals, CRS, the network node may further transmit information indicating a third ratio between the total transmission power available for the superposed transmission and the transmission power of the transmission resources used by the CRS. In some embodiments, when the network node is configured to perform the superposed transmission using a transmission mode comprising Demodulation Reference Signals, DMRS, the network node may divide the transmission power of the DMRS equally on the transmission resources of the antenna ports used by the DMRS. In some embodiments, when the network node is configured to perform the superposed transmission using a transmission mode comprising Demodulation Reference Signals, DMRS, the network node may, when the first and second signal are both single layer transmissions in the superposed transmission, set the transmission power of the DMRS to correspond to the total transmission power available for the superposed transmission. In some embodiments, when the network node is configured to perform the superposed transmission using a transmission mode comprising Demodulation Reference Signals, DMRS, the network node may, when the first and second signal are both single layer transmissions in the superposed transmission, set the transmission power of the DMRS to the transmission power used for Physical Downlink Shared Channel, PDSCH, transmissions to the second wireless device. In some embodiments, when the network node is configured to perform the superposed transmission using a transmission mode comprising Demodulation Reference Signals, DMRS, the network node may, when the first signal is a dual layer transmission and the second signal is a single layer transmission in the superposed transmission, set the transmission power of the DMRS on each layer so as to correspond to the transmission powers used for Physical Downlink Shared Channel, PDSCH, transmissions to the first and second wireless device on the respective layer, set the transmission power of the DMRS on each layer to correspond to half the total transmission power available for the superposed transmission, or set the transmission power of the DMRS on the single layer of the second signal to correspond to the transmission power used for Physical Downlink Shared Channel, PDSCH, transmissions to the second wireless device, and the transmission power of the DMRS on the other layer of the dual layer of the first signal to correspond to the remaining power of the total transmission power (P) available for the superposed transmission. In some embodiments, when the network node is configured to perform the superposed transmission using a transmission mode comprising Demodulation Reference Signals, DMRS, the network node may, when the first and second signal are both dual layer transmissions in the superposed transmission, set the transmission power of the DMRS to correspond to half the total transmission power available for the superposed transmission. In some embodiments, when the network node is configured to perform the superposed transmission using a transmission mode comprising Demodulation Reference Signals, DMRS, the network node may, when the first and second signal are both dual layer transmissions in the superposed transmission, set the transmission power of the DMRS to correspond to the transmission power used for Physical Downlink Shared Channel, PDSCH, transmissions to the second wireless device.

According to some aspects of embodiments herein, a method performed by a network node for performing a superposed transmission in a wireless communications network is provided. The network node transmits information indicating a number of bits in a first bit group intended for a first wireless device and a modulation order. Also, the network node concatenate the first bit group intended for the first wireless device and a second bit group to form a concatenated bit group. Then, the network node modulates the concatenated bit group in the modulator, the modulator producing one modulation symbol having the modulation order and corresponding to the concatenated bit group. Further, the network node transmits the modulated symbol. Furthermore, the average power of the transmitted modulation symbol when the first bit group varies is a first power, the average power of the transmitted modulation symbol when the concatenated bit group varies is a second power, and the ratio of the first power to the second power is set at least in part by the number of bits in the first bit group. In some embodiments, the network node may configure a modulator in the network node with a parameter, wherein the ratio of the first power to the second power is set by the parameter, and transmit information indicating the parameter. In some embodiments, the network node may transmit information indicating one or more of: the first power, the second power, and the ratio of the first power to the second power, to at least the first wireless device in the wireless communications network. In some embodiments, the second bit group corresponds to the low order bits of the modulator. In some embodiments, the network node may scale the modulated symbol by a value determined from the parameter.

According to some aspects of embodiments herein, a method performed by a first wireless device for handling a superposed transmission from a network node in a wireless communications network is provided. The superposed transmission comprises a first signal intended for the first wireless device and a second signal intended for a second wireless device that are superposed and transmitted simultaneously by the network node on the same transmission resources in the wireless communications network. The first wireless device receives information indicating a first and/or second ratio of the total transmission power available for the superposed transmission, which first ratio is to be used for the first signal and which second ratio is to be used for the second signal in the superposed transmission. Also, the first wireless device receives the superposed transmission. Further, the first wireless device estimates the channels associated with the first and second wireless device based on the received information and the superposed transmission. Furthermore, the first wireless device processes the first signal intended for the first wireless device using the estimated channels associated with the first and second wireless device. In some embodiments, when the first wireless device is configured to receive the superposed transmission using a transmission mode comprising Cell-specific Reference Signals, CRS, the first wireless device may receive information indicating a third ratio between the total transmission power available for the superposed transmission and the transmission power of the transmission resources used by the CRS.

According to some aspects of embodiments herein, a method performed by a second wireless device for handling a superposed transmission from a network node in a wireless communications network is provided. The superposed transmission comprises a first signal intended for the first wireless device and a second signal intended for a second wireless device that are superposed and transmitted simultaneously by the network node on the same transmission resources in the wireless communications network. The second wireless device receives information indicating a second ratio of the total transmission power available for the superposed transmission, which second ratio is to be used for the second signal in the superposed transmission. Also, the second wireless device receives the superposed transmission. Further, the second wireless device estimates the channels associated with the second wireless device based on the received information and the superposed transmission. Furthermore, the second wireless device processes the second signal intended for the second wireless device using the estimated channel associated with the second wireless device. In some embodiments, when the second wireless device is configured to perform the superposed transmission using a transmission mode comprising Cell-specific Reference Signals, CRS, the second wireless device may receive information indicating a third ratio between the total transmission power available for the superposed transmission and the transmission power of the transmission resources used by the CRS.

According to some aspects of embodiments herein, a method performed by a first wireless device for handling a superposed transmission from a network node in a wireless communications network is provided. The first wireless device receives information indicating a number of bits in a first bit group intended for a first wireless device and a modulation order. Also, the first wireless device receives a modulated symbol having the modulation order. Further, the first wireless device demodulates the modulated symbol, thereby determining a concatenated bit group that comprises a first bit group. Furthermore, the average power of modulation symbols produced by a modulator having the modulation order when the first bit group varies is a first power, the average power of modulation symbols produced by the modulator having the modulation order when the concatenated bit group varies is a second power, and the ratio of the first power to the second power is set at least in part by the number of bits in the first bit group. In some embodiments, the first wireless device may receive information indicating a parameter that configures a modulator that modulates the concatenated bit group, wherein the ratio of the first power to the second power is set by the parameter. In some embodiments, the first wireless device may receive information indicating one or more of the first power, the second power, and the ratio of the first power to the second power. In some embodiments, the second bit group corresponds to the low order bits of the modulator. In some embodiments, the first wireless device may assume that one or more of the bits in the concatenated bit group are random with equal probability of being '0' or '1'. In some embodiments, the modulated symbol is scaled by a value determined from the parameter.

According to some aspects of embodiments herein, a network node, a first wireless device and a second wireless device configured to perform the methods describes above, respectively, are also provided.

The terminology used in the detailed description of the particular exemplary embodiments illustrated in the accompanying drawings is not intended to be limiting of the described methods or of the network node 110, first wireless device 121 and the second wireless device 122.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

CRS Cell-specific Reference Signal
CQI Channel Quality Indication
CSI Channel State Information
CSI-RS Channel State Information Reference Signal
DL Downlink DMRS Demodulation Reference Signal
eNB enhanced Node B
EPRE Energy Per Resource Element
ID Identity
IE Information Element
MUST Multi-User Superposition Transmission
NOMA Non-orthogonal Multiple Access
OMA Orthogonal Multiple Access
PDSCH Physical Downlink Shared Channel
PMI Precoding Matrix Indication
RE Resource Element
RRC Radio Resource Control
RS Reference Signal
Rx Receive
SC Superposition Coding
SINR Signal to Interference and Noise Ratio
TM PDSCH Transmission Mode
Tx Transmit
UE User Equipment

The invention claimed is:

1. A method performed by a network node for performing a superposed transmission in a wireless communications network, the superposed transmission comprising a first signal intended for a first wireless device from the network node and a second signal intended for a second wireless device from the network node that are superposed and transmitted simultaneously by the network node on the same transmission resources in the wireless communications network, the method comprising:
    determining a first ratio of the total transmission power (P) available for the superposed transmission, which first ratio is to be used for the first signal in the superposed transmission;
    determining a second ratio of the total transmission power (P) available for the superposed transmission, which second ratio is to be used for the second signal in the superposed transmission;
    transmitting information indicating at least one of the first and the second ratio to at least the first wireless device in the wireless communications network, the information indicating the at least one of the first and the second ratio being provided dynamically through one of a Physical Downlink Control Channel, PDCCH, and an Enhanced Physical Downlink Control Channel, EPDCCH;
    transmitting information indicating a third ratio between an average transmission power available for the superposed transmission per Resource Element, RE, in the Orthogonal Frequency Division Multiplexing, OFDM, grid not comprising Cell-specific Reference Signals, CRS, and an average CRS transmission power per RE; and
    performing the superposed transmission, using a transmission mode comprising CRS, to the first and second wireless device simultaneously on the same transmission resources by transmitting the first signal using a transmission power according to the first ratio and by transmitting the second signal using a transmission power according to the second ratio.

2. The method according to claim 1, wherein the same transmission resources are the same time and frequency transmission resources in the wireless communications network.

3. The method according to claim 1, wherein the transmitting further comprises transmitting the information indicating the second ratio to the second wireless device.

4. The method according to claim 1, wherein the transmitting further comprises transmitting the information indicating the at least one of the first and the second ratio to the first wireless device only.

5. The method according to claim 1, wherein the information indicating the at least one of the first and the second ratio is signaled semi-statically through Radio Resource Control, RRC, messages.

6. The method according to claim 1, wherein the information indicating the at least one of the first and the second ratio is signaled explicitly using a number of predetermined bits, wherein each predetermined bit indicates a particular ratio.

7. The method according to claim 1, wherein the first ratio is uniformly quantized within the range between 0 and 0.5, and the second ratio is uniformly quantized with the range between 0.5 and 1.

8. The method according to claim 1, wherein the first ratio is non-uniformly quantized within the range between 0 and 0.5 and the second ratio is non-uniformly quantized with the range between 0.5 and 1.

9. The method according to claim 1, wherein the performing further comprises transmitting the second signal as single layer transmission with QPSK modulation.

10. A network node for performing a superposed transmission in a wireless communications network, the superposed transmission comprising a first signal intended for a first wireless device from the network node and a second signal intended for a second wireless device from the network node that are superposed and transmitted simultaneously by the network node on the same transmission resources in the wireless communications network, the network node comprising:
    a processor and transmitter configured to:
        determine a first ratio of the total transmission power (P) available for the superposed transmission, which first ratio is to be used for the first signal in the superposed transmission;
        determine a second ratio of the total transmission power (P) available for the superposed transmission, which second ratio is to be used for the second signal in the superposed transmission;
        transmit information indicating at least one of the first and the second ratio to at least the first wireless device in the wireless communications network, the information indicating the at least one of the first and the second ratio being provided dynamically through one of a Physical Downlink Control Channel, PDCCH, and an Enhanced Physical Downlink Control Channel, EPDCCH;
        transmit information indicating a third ratio between an average transmission power available for the superposed transmission per Resource Element, RE, in the Orthogonal Frequency Division Multiplexing, OFDM, grid not comprising Cell-specific Reference Signals, CRS, and an average CRS transmission power per RE; and
        perform the superposed transmission, using a transmission mode comprising CRS, to the first and second wireless device simultaneously on the same transmission resources by transmitting the first signal using a transmission power according to the first ratio and by transmitting the second signal using a transmission power according to the second ratio.

11. The network node according to claim 10, wherein the same transmission resources are the same time and frequency transmission resources in the wireless communications network.

12. The network node according to claim 10, further configured to transmit the information indicating the second ratio to the second wireless device.

13. The network node according to claim 10, further configured to transmit the information indicating the at least one of the first and the second ratio to the first wireless device only.

14. The network node according to claim 10, further configured to signal the information indicating the at least one of the first and the second ratio semi-statically through Radio Resource Control, RRC, messages.

15. The network node according to claim 10, further configured to signal the information indicating the at least one of the first and the second ratio explicitly using a number of predetermined bits, wherein each predetermined bit indicates a particular ratio.

16. The network node according to claim 10, wherein the first ratio is uniformly quantized within the range between 0 and 0.5, and the second ratio is uniformly quantized within the range between 0.5 and 1.

17. The network node according to claim 10, wherein the first ratio is non-uniformly quantized within the range between 0 and 0.5 and the second ratio is non-uniformly quantized within the range between 0.5 and 1.

18. The network node according to claim 10, further configured to transmit the second signal as single layer transmission with QPSK modulation.

19. A method performed by a first wireless device for handling a superposed transmission from a network node in a wireless communications network, the superposed transmission comprising a first signal intended for the first wireless device and a second signal intended for a second wireless device that are superposed and transmitted simultaneously by the network node on the same transmission resources in the wireless communications network, the method comprising:
  receiving information indicating at least one of a first and a second ratio of the total transmission power (P) available for the superposed transmission, which first ratio is to be used for the first signal and which second ratio is to be used for the second signal in the superposed transmission;
  receiving the superposed transmission;
  estimating the effective channels associated with the first and second wireless device and the second signal based on the received information and the superposed transmission; and
  processing the first signal intended for the first wireless device using the estimated effective channels associated with the first and second wireless device and the estimated second signal; and
  the receiving, when the network node is configured to perform the superposed transmission using a transmission mode comprising a cell specific reference signal, CRS, further comprises:
  receiving information indicating a third ratio between the average transmission power available for the superposed transmission per resource element, RE, in the orthogonal frequency division multiplexing, OFDM, grid not comprising CRS, and the average CRS transmission power per RE.

20. The method according to claim 19, wherein the processing further comprises subtracting the estimated second signal from the received superposed transmission to obtain the first signal.

21. The method according to claim 19, wherein the receiving, when the network node is configured to perform the superposed transmission using a transmission mode comprising CRS, further comprises:
  receiving information indicating a ratio between the average transmission power available for Physical Downlink Shared Channel, PDSCH, transmissions per RE in the OFDM grid and the average CRS transmission power per RE that is to be used by the first wireless device;
  receiving information indicating a ratio between the average transmission power available for the superposed transmission per RE in the OFDM grid not comprising CRS and the average CRS transmission power per RE that is to be used by the first wireless device; and
  receiving information indicating a ratio between the average transmission power available for non-superposed PDSCH transmissions per RE in the OFDM grid and the average CRS transmission power per RE that is to be used by the first wireless device.

22. A first wireless device for handling a superposed transmission from a network node in a wireless communications network, the superposed transmission comprising a first signal intended for the first wireless device and a second signal intended for a second wireless device that are superposed and transmitted simultaneously by the network node on the same transmission resources in the wireless communications network, the first wireless device comprising:
  a processor and receiver configured to:
    receive information indicating at least one of a first and a second ratio of the total transmission power (P) available for the superposed transmission, which first ratio is to be used for the first signal and which second ratio is to be used for the second signal in the superposed transmission, receive the superposed transmission;
    estimate the effective channels associated with the first and second wireless device based on the received information and the superposed transmission;
    process the first signal intended for the first wireless device using the estimated effective channels associated with the first and second wireless device; and
    when the network node is configured to perform the superposed transmission using a transmission mode comprising a cell specific reference signal, CRS, the first wireless device is configured to:
    receive information indicating a third ratio between the average transmission power available for the superposed transmission per resource element, RE, in the orthogonal frequency division multiplexing, OFDM, grid not comprising CRS, and the average CRS transmission power per RE.

23. The first wireless device according to claim 22, further configured to process the first signal by subtracting the second signal from the received superposed transmission to obtain the first signal.

24. The first wireless device according to claim 22, wherein, when the network node is configured to perform the superposed transmission using a transmission mode comprising CRS, the first wireless device is configured to:
  receive information indicating a ratio between the average transmission power available for Physical Downlink Shared Channel, PDSCH, transmissions per RE in the OFDM grid and the average CRS transmission power per RE that is to be used by the first wireless device;

receive information indicating a ratio between the average transmission power available for the superposed transmission per RE in the OFDM grid not comprising CRS and the average CRS transmission power per RE that is to be used by the first wireless device; and receive information indicating a ratio between the average transmission power available for non-superposed PDSCH transmissions per RE in the OFDM grid and the average CRS transmission power per RE that is to be used by the first wireless device.

\* \* \* \* \*